(12) United States Patent
Barber

(10) Patent No.: US 6,966,091 B2
(45) Date of Patent: Nov. 22, 2005

(54) COIL INNERSPRING ASSEMBLY HAVING VARYING DEGREES OF FIRMNESS

(75) Inventor: James R. Barber, Anderson, IN (US)

(73) Assignee: Barber Manufacturing Company, Inc., Anderson, IN (US)

(*) Notice: Subject to any disclaimer, the term of this patent is extended or adjusted under 35 U.S.C. 154(b) by 8 days.

(21) Appl. No.: 10/723,561

(22) Filed: Nov. 26, 2003

(65) Prior Publication Data

US 2004/0128773 A1 Jul. 8, 2004

Related U.S. Application Data

(60) Provisional application No. 60/429,626, filed on Nov. 27, 2002.

(51) Int. Cl.[7] .............................................. A47C 17/00
(52) U.S. Cl. ...................... 5/716; 5/720; 5/727; 5/248; 5/256; 267/89; 267/93
(58) Field of Search .......................... 5/716, 720, 727, 5/248, 256; 267/85, 89, 91, 93

(56) References Cited

U.S. PATENT DOCUMENTS

| | | | |
|---|---|---|---|
| 685,160 A | 10/1901 | Marshall | |
| 698,529 A | 4/1902 | Marshall | |
| 1,051,466 A | 1/1913 | Travis | |
| 1,852,943 A | 5/1932 | Swanson | |
| 1,930,697 A | 10/1933 | Stewart | |
| 2,236,007 A | 3/1941 | Oldham | |
| 2,504,352 A | 4/1950 | Robell | |
| 2,558,288 A | 6/1951 | Backus | |
| 2,568,055 A | 9/1951 | Clark | |
| 2,715,435 A | 8/1955 | Rymland | |
| 3,082,438 A | 3/1963 | Nachman, Jr. | |
| 3,230,558 A | 1/1966 | Duncan | |
| 3,626,523 A | 12/1971 | Robins | |
| 4,052,760 A * | 10/1977 | Golembeck et al. | ........... 5/248 |
| 4,161,046 A * | 7/1979 | Golembeck | .................... 5/248 |
| 4,234,983 A | 11/1980 | Stumpf | |
| 4,234,984 A | 11/1980 | Stumpf | |
| 4,462,129 A | 7/1984 | Brannock | |
| 4,578,834 A | 4/1986 | Stumpf | |

(Continued)

FOREIGN PATENT DOCUMENTS

DE 40 31 651 A1 10/1990

(Continued)

*Primary Examiner*—Michael Trettel
(74) *Attorney, Agent, or Firm*—Woodard, Emhardt, Moriarty, McNett & Henry LLP

(57) ABSTRACT

An innerspring assembly comprising at least two sets of coil springs. In one embodiment, a first set of coil springs has a first elevation, a second set of coil springs has a second elevation different from the first elevation, and wherein one of the first and second sets of coil springs is compressed upon initial loading of the innerspring assembly, and wherein each of the first and second sets of coil springs is compressed upon continued loading of the innerspring assembly. In another embodiment, a first set of coil springs is pre-loaded to a first compressed state and a second set of the coil springs is pre-loaded to a second compressed state that exhibits a different degree of firmness relative to the first compressed state. In yet another embodiment, a first set of the coil springs has a barrel-shaped outer profile while a second set of the coil springs has an hourglass-shaped outer profile. In still another embodiment, each set of coil springs has a barrel-shaped outer profile defining different coil diameters.

41 Claims, 9 Drawing Sheets

U.S. PATENT DOCUMENTS

| | | |
|---|---|---|
| 4,677,701 A | 7/1987 | Galumbeck |
| 4,679,266 A | 7/1987 | Kraft |
| 4,726,572 A | 2/1988 | Flesher et al. |
| 4,771,495 A | 9/1988 | Distler et al. |
| 4,854,023 A | 8/1989 | Stumpf |
| 4,972,536 A | 11/1990 | Scott |
| 5,040,255 A | 8/1991 | Barber, Jr. |
| 5,062,172 A | 11/1991 | Stewart |
| 5,136,740 A | 8/1992 | Kraft |
| 5,210,890 A | 5/1993 | Hagglund |
| 5,222,264 A | 6/1993 | Morry |
| 5,756,022 A | 5/1998 | Siegel et al. |
| 5,803,440 A | 9/1998 | Wells |
| 5,868,383 A | 2/1999 | Codos |
| 5,987,678 A | 11/1999 | Ayers |
| 6,101,697 A | 8/2000 | Stumpf et al. |
| 6,131,892 A | 10/2000 | Stumpf |
| 6,260,331 B1 | 7/2001 | Stumpf |
| 6,347,423 B1 | 2/2002 | Stumpf |
| 6,353,952 B1 * | 3/2002 | Wells ........................ 5/716 |
| 6,398,199 B1 * | 6/2002 | Barber ....................... 267/93 |
| 6,540,214 B2 | 4/2003 | Barber |
| 6,813,791 B2 * | 11/2004 | Mossbeck et al. ............. 5/720 |
| 2003/0074736 A1 * | 4/2003 | Grothaus .................... 5/655.8 |

FOREIGN PATENT DOCUMENTS

| | | |
|---|---|---|
| DE | 297 10 267 U1 | 8/1997 |
| EP | 1 029 472 A1 | 8/2000 |
| FR | 2 697 420 | 10/1992 |
| WO | WO 91/10387 | 7/1991 |

* cited by examiner

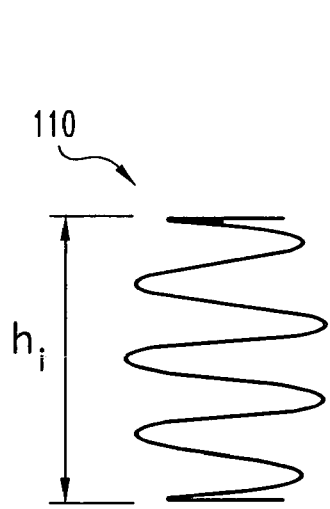
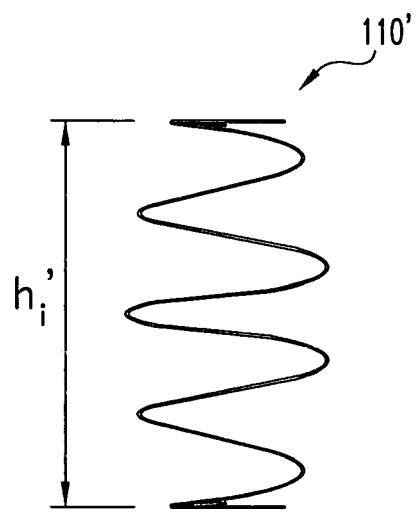
*Fig. 15a*  *Fig. 15b*
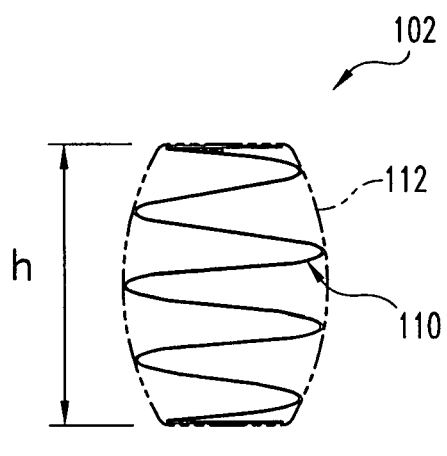
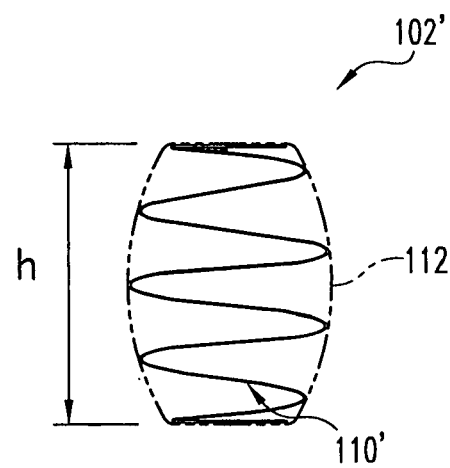
*Fig. 16a*  *Fig. 16a*

COIL INNERSPRING ASSEMBLY HAVING VARYING DEGREES OF FIRMNESS

REFERENCE TO RELATED APPLICATIONS

The present application claims the benefit of Provisional Application Ser. No. 60/429,626 filed on Nov. 27, 2002, the contents of which are hereby incorporated by reference in their entirety.

FIELD OF THE INVENTION

The present invention generally relates to coil innerspring assemblies, and more particularly relates to coil innerspring assemblies having varying degrees of firmness.

BACKGROUND OF THE INVENTION

A variety of mattress designs having coil innerspring assemblies have been developed within the industry and have been in use for a number of years. Most of these innerspring mattresses were designed to have uniform firmness across their entire length and/or width, with each spring in the mattress exerting the same level of resistance for a given spring deformation.

In recent years, coil innerspring assemblies have been developed which provide the mattress with multiple sections having different degrees of firmness. The variation in firmness between mattress sections is often referred to as "posturized" or "posturization". One example of a posturized coil innerspring assembly is described in U.S. Pat. No. 6,398,199 to Barber. As disclosed in the '199 patent, the weight of different regions of an individual's body can vary significantly (e.g., the head, torso and leg regions). As a result, the different regions of the body tend to exert different forces or loadings onto the corresponding sections of the mattress when the individual lies on the mattress in a prone position. For example, the head and leg regions of the body tend to exert less force or loading onto the mattress compared to the torso region of the body. To accommodate for this variation in loading, the coil innerspring assembly disclosed in the '199 patent is designed to provide the innerspring mattress with multiple sections or areas having different degrees of firmness or resistance to loading.

While advances have been made in the industry to provide an innerspring mattress having increased comfort, there is a continuing need to provide improved coil innerspring assemblies, particularly with regard to coil innerspring assemblies having a firmness which varies between initial loading of the mattress (e.g., when an individual first lies down on the mattress) and on-going loading of the mattress (e.g., continued support of the individual lying on the mattress).

Thus, there is a general need in the industry to provide an improved coil innerspring assembly having varying degrees of firmness. The present invention meets this need and provides other benefits and advantages in a novel and unobvious manner.

SUMMARY OF THE INVENTION

The present invention relates generally to an innerspring assembly having varying degrees of firmness which may be incorporated into, for example, an innerspring mattress. While the actual nature of the invention covered herein can only be determined with reference to the claims appended hereto, certain forms of the invention that are characteristic of the preferred embodiments disclosed herein are described briefly as follows.

In one form of the invention, an innerspring assembly is provided which includes at least two sets of coil springs. A first set of coil springs has a first height, a second set of coil springs has a second height that is different from the first height, and wherein one of the first and second sets of coil springs is compressed upon initial loading of the innerspring assembly, and wherein each of the first and second sets of coil springs is compressed upon continued loading of the innerspring assembly.

In another form of the invention, an innerspring assembly is provided which includes at least two sets of coil springs. A first set of coil springs has an upper surface arranged at a first elevation, a second set of coil springs has an upper surface arranged at a second elevation that is different from the first elevation, and wherein one of the first and second sets of coil springs is compressed upon initial loading of the innerspring assembly, and wherein each of the first and second sets of coil springs is compressed upon continued loading of the innerspring assembly.

In another form of the invention, an innerspring assembly is provided which includes at least two sets of coil springs. A first set of coil springs is pre-loaded to a first compressed state, a second set of coil springs is pre-loaded to a second compressed state, and wherein the first and second compressed states exhibit different degrees of firmness.

In another form of the invention, an innerspring assembly is provided which includes at least two sets of coil springs. A first set of coil springs has a barrel-shaped outer profile defining a convex side surface, a second set of coil springs has an hourglass-shaped outer profile defining a concave side surface, and wherein the convex side surface of one of the barrel-shaped coil springs is positioned proximate the concave side surface of an adjacent one of the hourglass-shaped coil springs.

In another form of the invention, an innerspring assembly is provided which includes at least two sets of coil springs. A first set of coil springs has a barrel-shaped outer profile defining a first outer coil diameter, a second set of coil springs has a barrel-shaped outer profile defining a second outer coil diameter, and wherein the first outer coil diameter of the first set of barrel-shaped coil springs is different from the second outer coil diameter of the second set of barrel-shaped coil springs.

It is one object of the present invention to provide an improved coil innerspring assembly.

Further objects, features, advantages, benefits, and/or further aspects of the present invention will become apparent from the drawings and description set forth herein.

BRIEF DESCRIPTION OF THE DRAWING FIGURES

Figure 1:
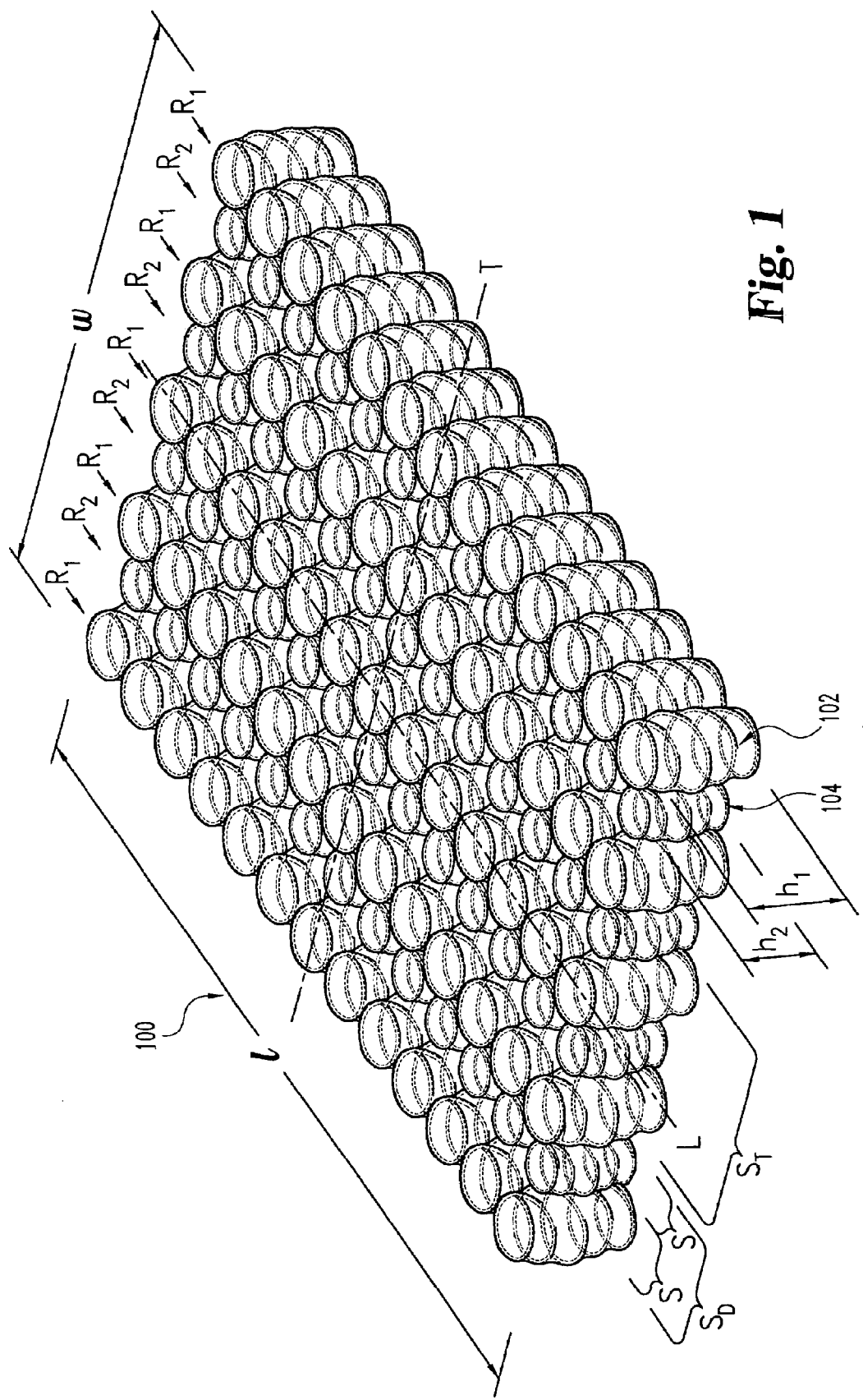
FIG. 1 is a side perspective view of an innerspring assembly according to one form of the present invention, including first and second sets of coil innersprings having different pocketed heights to provide the innerspring assembly with varying degrees of firmness.
Figure 14:
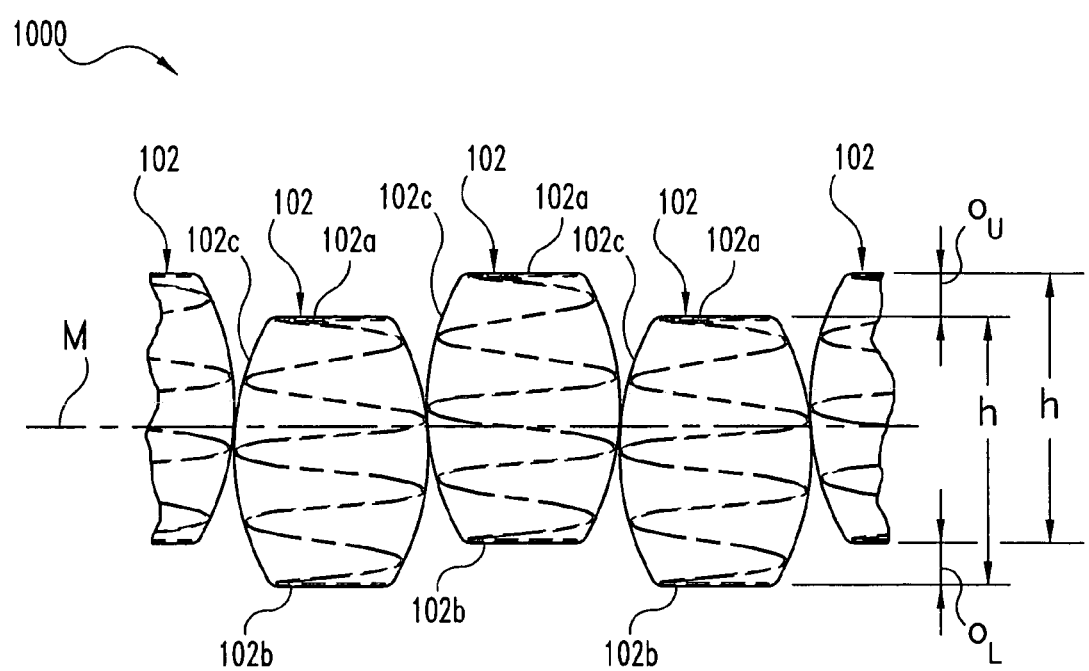

FIG. 14 is a partial end elevational view of an alternative embodiment of the innerspring assembly illustrated in FIG. 1, wherein each of the pocketed coil innersprings has a uniform height, with a first set of the pocketed coil innersprings arranged at a different elevation relative to a second set of the pocketed coil innersprings to provide the innerspring assembly with varying degrees of firmness.

FIG. 15a is a side elevational view of a coil spring according to one embodiment of the invention for use in association with the innerspring assembly illustrated in FIG. 14, as shown in an initial uncompressed state.

FIG. 15b is a side elevational view of a coil spring according to another embodiment of the invention for use in association with the innerspring assembly illustrated in FIG. 14, as shown in an initial uncompressed state.

FIG. 16a is a side elevational view of the coil spring illustrated in FIG. 15a, as shown in a pre-loaded compressed state and encased within a spring pocket to define a pocketed coil spring height.

FIG. 16b is a side elevational view of the coil spring illustrated in FIG. 15b, as shown in a pre-loaded compressed state and encased within a spring pocket to define a pocketed coil spring height.

DESCRIPTION OF THE ILLUSTRATED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is hereby intended, such alterations and further modifications in the illustrated devices, and such further applications of the principles of the invention as illustrated herein being contemplated as would normally occur to one skilled in the art to which the invention relates.

Referring to FIG. 1, shown therein is a coil innerspring assembly 100 according to one form of the present invention. The innerspring assembly 100 is generally comprised of a plurality of pocketed coil springs and has a length l extending generally along a longitudinal axis L and a width w extending generally along a transverse axis T. As will be discussed in greater detail below, each of the pocketed coil springs preferably includes an inner coil spring individually encased within an outer spring pocket.

In a preferred embodiment of the invention, the innerspring assembly 100 includes at least two sets or groups of pocketed coil springs having different pocketed heights. In the illustrated embodiment of the invention, the innerspring assembly 100 includes a first set of pocketed coil springs 102 having first height $h_1$ and a second set of pocketed coil springs 104 having lesser second height $h_2$. However, it should be understood that in other embodiments of the invention, the innerspring assembly 100 may include three or more sets of pocketed coil springs, with each set of pocketed coil springs having a different pocketed height. As will be discussed in greater detail below, the first set of pocketed coil springs 102 (having the greater height $h_1$) provides a degree of initial comfort or plush as the occupant(s) lies down on the innerspring assembly 100, while the second set of pocketed coil springs 104 (having the lesser height $h_2$) subsequently provides an added degree of firmness to the innerspring assembly 100 to properly support the occupant(s).

In the illustrated embodiment of the innerspring assembly 100, the first and second sets of the pocketed coil springs 102, 104 are each arranged in axially extending rows or strings $R_1$, $R_2$, respectively, running along the length l of the innerspring assembly 100 (i.e., in a head-to-toe direction). However, in other embodiments of the invention, each of the first and second sets of the pocketed coil springs 102, 104 may alternatively be arranged in transversely extending rows or strings running across the width w of the innerspring assembly 100 (i.e., in a side-to-side direction). In the illustrated embodiment of the innerspring assembly 100, the rows $R_1$, $R_2$ of the first and second sets of the pocketed coil springs 102, 104 are disposed in an alternating relationship, with each row $R_1$ of the first set of pocketed coil springs 102 being positioned adjacent a row $R_2$ of the second set of pocketed coil springs 104.

In other embodiments of the invention, the rows $R_1$, $R_2$ of the first and second sets of pocketed coil springs 102, 104 may be arranged to define alternative configurations of the innerspring assembly 100. For example, two or more rows $R_1$ of the pocketed coil springs 102 may be positioned laterally adjacent one another to form one or more sections or zones of pocketed coil springs having a first height $h_1$ and/or two or more rows $R_2$ of the pocketed coil springs 104 may be positioned laterally adjacent one another to form one or more sections or zones of pocketed coil springs having a second height $h_2$. As should be appreciated, the section(s) of coil springs 102 having the height $h_1$ would provide a different "feel" or degree of firmness compared to the section(s) of coil springs 104 having the height $h_2$. This variation in feel or firmness between two or more zones is sometimes referred to as "posturized" or "posturization". As should also be appreciated, the innerspring assembly 100 may include three or more sections or zones of pocketed coil springs, each exhibiting a different feel or degree of firmness, thereby providing the innerspring assembly 100 with an even greater level of posturization.

In one embodiment of the invention, the innerspring assembly 100 may include three discrete posturized sections or zones extending across the width w to accommodate for the particular loading requirements associated with various regions of the occupant's body (e.g., the head, torso and leg regions) when lying on the innerspring assembly 100 in a prone position. In another embodiment of the invention, the innerspring assembly 100 may include two discrete posturized sections or zones extending along the length l to accommodate for the particular loading requirements associated with respective occupants. Further details regarding other posturized features or arrangements that may be used in association with the present invention are illustrated and described in U.S. Pat. No. 6,398,199 to Barber, the contents of which have been incorporated herein by reference.

In one embodiment of the invention, each row $R_1$, $R_2$ of the first and second sets of pocketed coil springs 102, 104 is formed as an integral/continuous strip or string S, with each strip S including a plurality of interconnected pocketed coil springs arranged in an upright or upstanding orientation. One method of forming the strips S of pocketed coil springs is illustrated and described in U.S. Pat. No. 6,398,199 to Barber, the contents of which have been incorporated herein by reference. Another method of forming the strips S of pocketed coil springs is illustrated and described in a co-pending U.S. Utility Application entitled "Encased Coil Innerspring Assembly" Ser. No. 10/722,850, the contents of which are hereby incorporated herein by reference. It should be understood, however, that other methods of forming strips of pocketed coil springs are also contemplated as would occur to one of skill in the art.

In another embodiment of the invention, adjacent strips S of the pocketed coil springs may be coupled together via any number of a variety of methods including, for example, welding, gluing, adhering, wiring, tying, fastening and/or any other method of coupling that would occur to one of skill in the art. As used herein, the term "coupling" is broadly defined to encompass any means for connecting, attaching, affixing, adjoining, linking or any other means for coupling one element to another element. In a further embodiment of the invention, two adjacent strips S of pocketed coil springs may be coupled together, such as, for example, by welding, to form a dual strip $S_D$ of pocketed coil springs. In yet another embodiment of the invention, three adjacent strips S of pocketed coil springs may be coupled together to form a triple strip $S_T$ of pocketed coil springs. Two or more of the dual strips $S_D$ and/or the triple strips $S_T$ of pocketed coil springs may subsequently be coupled together, such as, for example, by gluing, to form the coil innerspring assembly 100. It should be understood that each adjacent pair of pocketed coil springs in the adjacent strips S need not necessarily be coupled together to form the dual strips $S_D$ and/or the triple strips $S_T$ of pocketed coil springs. For example, every other adjacent pair, every third adjacent pair, etc., of pocketed coil springs in the adjacent strips S may be coupled together to form the dual strips $S_D$ and/or triple strips $S_T$ of pocketed coil springs.

One method of forming dual or triple strips of pocketed coil springs and a complete coil innerspring assembly is illustrated and described in a co-pending U.S. Utility Application entitled "Encased Coil Innerspring Assembly" Ser. No. 10/722,850, the contents of which have been incorporated herein by reference. However, it should be understood that other methods for forming dual strips $S_D$ or triple strips $S_T$ of pocketed coil springs and the complete coil innerspring assembly 100 are also contemplated as would occur to one of skill in the art.

In yet another embodiment of the invention, the pocketed coil springs 102, 104 may be integrated together to form the coil innerspring assembly 100 via the use of a top sheeting member (not shown) and/or a bottom sheeting member (not shown), sometimes referred to as top and bottom scrims. It should be understood that the use of top and/or bottom scrims may be used in lieu of or in addition to the methods described above for forming the coil innerspring assembly 100. One example of integrating a number of pocketed coil springs to form a coil innerspring assembly via the use of a top and bottom scrims is illustrated and described in U.S. Pat. No. 6,398,199 to Barber, the contents of which have been incorporated herein by reference.

Figure 2:
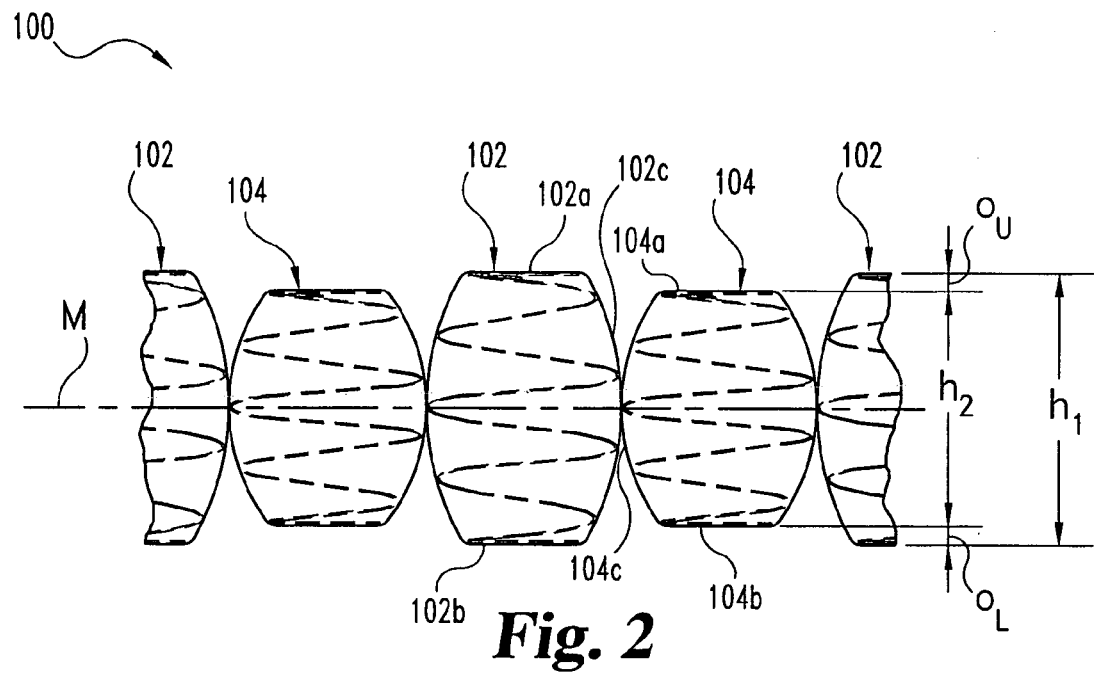
FIG. 2 is a partial end elevational view of the innerspring assembly illustrated in FIG. 1.

Referring now to FIG. 2, shown therein is a partial end elevational view of the innerspring assembly 100 illustrating the arrangement and relationship of the first set of pocketed coil springs 102 relative to the second set of pocketed coil springs 104. The pocketed coil springs 102 have an upper surface 102a and an opposite lower surface 102b, thereby defining the first pocketed coil spring height $h_1$. Similarly, the pocketed coil springs 104 have an upper surface 104a and an opposite lower surface 104b, thereby defining the second pocketed coil spring height $h_2$. As discussed above, the first and second pocketed coil spring heights $h_1$, $h_2$ are different, thereby providing the innerspring assembly 100 with a non-uniform or variable height. As will be discussed in greater detail below, in one embodiment of the invention, the pocketed coil springs 102, 104 each define a barrel-shaped outer profile, with the pocketed coil springs 102 having a convex side surface 102c and the pocketed coil springs 104 having a convex side surface 104c. The adjacent rows $R_1$, $R_2$ of the pocketed coil springs 102, 104 are arranged such that the convex side surfaces 102c, 104c are positioned proximately adjacent one another, and preferably in direct contact with one another.

In the illustrated embodiment of the invention, adjacent rows $R_1$, $R_2$ of the first and second sets of pocketed coil springs 102, 104 are arranged such that the mid-portions or waists of the pocketed coil springs 102, 104 extend generally along a central midline axis M, thereby defining an upper offset $o_U$ between the upper pocketed coil spring surfaces 102a, 104a and a lower offset $o_L$ between the lower pocketed coil spring surfaces 102b, 104b. In the illustrated embodiment of the invention, the upper coil spring offset $o_U$ is approximately equal to the lower coil spring offset $o_L$ or, stated another way, the upper and lower coil spring surfaces 102a, 104a and 102b, 104b are positioned approximately equidistant from the central midline axis M. In a specific embodiment of the invention, the pocketed height $h_1$ of the coil springs 102 is approximately seven (7) inches and the pocketed height $h_2$ of the coil springs 104 is approximately six (6) inches, thereby providing upper and lower coil spring offsets $o_U$, $o_L$ of about one-half (0.5) inch each.

It should be understood that the particular arrangement and the specific dimensions of the pocketed coil springs 102, 104 illustrated in FIGS. 1 and 2 are exemplary, and that other arrangements and sizes of the pocketed coil springs 102, 104 are also contemplated as falling within the scope of the present invention. For example, the upper and lower coil spring offsets $o_U$, $o_L$ need not necessarily be equal. Instead, the upper coil spring offsets $o_U$ may be greater than or less than the lower coil spring offsets $o_L$. Additionally, as will be discussed more fully below, the lower pocketed coil spring surfaces 102b, 104b may be arranged in a generally flush or planar arrangement, with only the upper pocketed coil spring surfaces 102a, 104a being offset relative to one another. Likewise, the upper pocketed coil spring surfaces 102a, 104a may be arranged in a generally flush or planar arrangement, with only the lower pocketed coil spring surfaces 102b, 104b being offset relative to one another.

It should also be understood that each of the pocketed coil springs 102 need not necessarily be arranged such that the upper/lower surfaces 102a, 102b are arranged generally flush with one another. Instead, the upper/lower surfaces 102a, 102b of one or more of the pocketed coil springs 102 can be offset or arranged at different elevations relative to one another. Similarly, each of the pocketed coil springs 104 need not necessarily be arranged such that the upper/lower surfaces 104a, 104b are arranged generally flush with one another. Instead, the upper/lower surfaces 104a, 104b of one or more of the pocketed coil springs 104 can be offset or arranged at different elevations relative to one another.

It should be appreciated that when an occupant lies down on the innerspring assembly 100, a certain grouping of the pocketed coil springs 102 having the greater height $h_1$ will absorb the initial loading associated with the weight of the occupant. It should also be appreciated that as the pocketed coil springs 102 are compressed and the upper surface 102a of the pocketed coil springs 102 are displaced to a position generally flush or even with the upper surface 104a of the adjacent pocketed coil springs 104 (i.e., with the upper offset $o_U$ at or near zero), the pocketed coil springs 104 will also be compressed and will begin to absorb a portion of the loading associated with the weight of the occupant. Since the initial loading of the innerspring assembly 100 is absorbed exclusively by the pocketed coil springs 102, with little to no loading being absorbed by the pocketed coil springs 104, the rate of compression or deflection of the pocketed coil springs 102 will be relatively high. As a result, the innerspring assembly 100 is initially provided with a soft or "plush" feel, which in turn provides the occupant with an added degree of comfort when the occupant initially lies down on the innerspring assembly 100. However, once the pocketed coil springs 102 are compressed to a point where the upper surfaces 102a, 104a are generally flush or even with one another, the pocketed coil springs 104 will begin to absorb a portion of the loading. The increased resistance to loading provided by the second set of pocketed coil springs 104 results in a reduced rate of compression or deflection of the pocketed coil springs 102, 104. Additionally, the increased resistance to loading provided by the combined effects of the pocketed coil springs 102, 104 gives the innerspring assembly 100 a "firm" feel, which in turn provides the occupant with an added degree of support.

Figure 3:
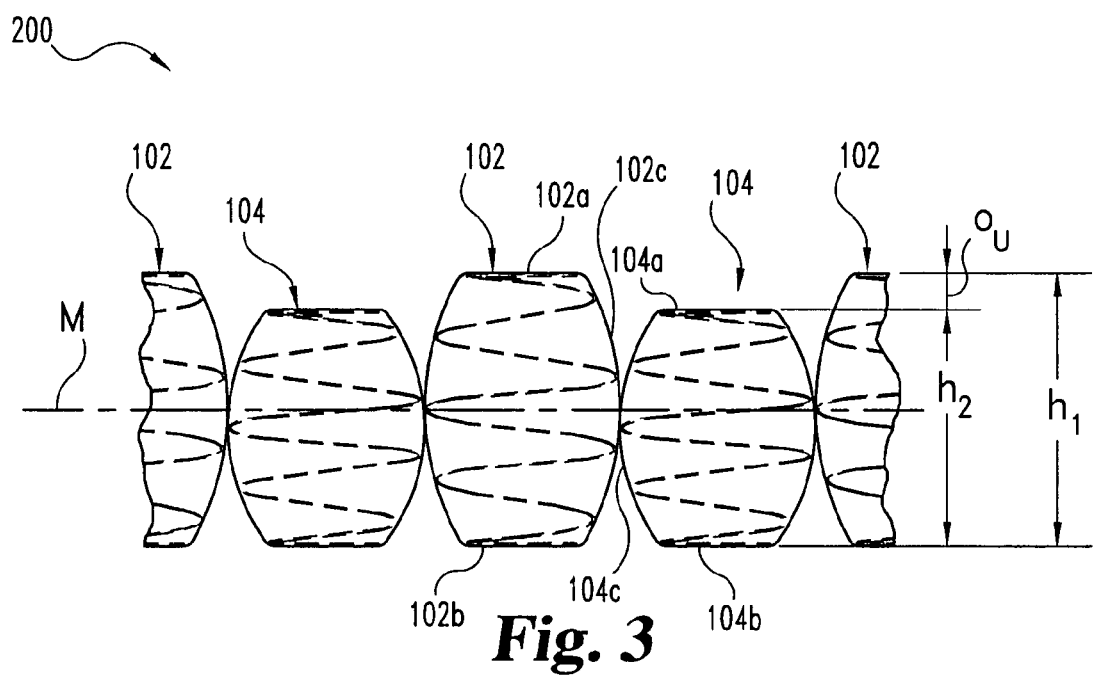
FIG. 3 is a partial end elevational view of an alternative embodiment of the innerspring assembly illustrated in FIG. 1, wherein the bottoms of each of the pocketed coil innersprings are arranged flush with one another.

Referring to FIG. 3, shown therein is a coil innerspring assembly 200 according to another embodiment of the present invention. Similar to the innerspring assembly 100, the innerspring assembly 200 is generally comprised of a plurality of pocketed coil springs 102 and 104 arranged in rows $R_1$, $R_2$, respectively, and defining different pocketed height $h_1$, $h_2$, respectively. However, the pocketed coil springs 102, 104 of the innerspring assembly 200 are arranged such that the bottom surfaces 102b, 104b are substantially flush or even with one another so as to define an upper coil spring offset $o_U$ between the upper surfaces 102a, 104a, but with no lower coil spring offset. In one embodiment of the invention, adjacent rows $R_1$, $R_2$ of the pocketed coil springs 102, 104 are attached together at a location slightly below a central midline axis M extending along the midportions or waists of the taller pocketed coil springs 102. The innerspring assembly 200 is particularly useful when used in association with one-sided innerspring mattresses, commonly referred to as "no-flip" or "no-turn" mattresses, wherein the upper surfaces 102a, 104a of the pocketed coil springs 102, 104 would preferably remain in an upwardly-facing direction.

The innerspring assembly 200 functions in a manner similar to that of the innerspring assembly 100. Specifically, when an occupant lies down on the innerspring assembly 200, a certain grouping of the coil springs 102 having the greater height $h_1$ will absorb the initial loading associated with the weight of the occupant. However, as the coil springs 102 are compressed and the upper surfaces 102a of the coil springs 102 are displaced to a position generally flush or even with the upper surfaces 104a of the adjacent coil springs 104 (i.e., with the upper coil spring offset $o_U$ at or near zero), the coil springs 104 will also be compressed and will begin to absorb a portion of the loading associated with the weight of the occupant. As a result, the pocketed coil springs 102 provide the innerspring assembly 200 with a soft or "plush" feel to provide the occupant with an added degree of comfort, while the combined effects of the pocketed coil springs 102, 104 provide the innerspring assembly 200 with an added degree of support or firmness.

Figure 4:
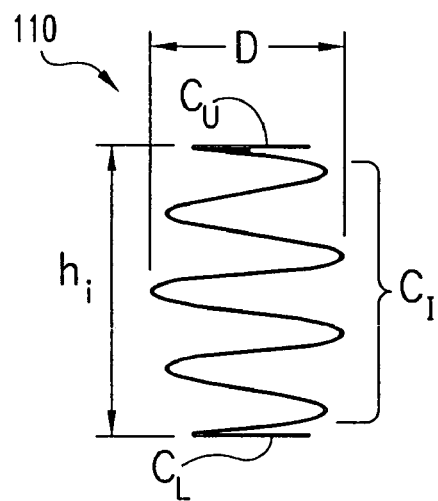
FIG. 4 is a side elevational view of a coil spring according to one embodiment of the invention for use in association with the innerspring assembly illustrated in FIG. 1, as shown in an initial uncompressed state.

Referring to FIG. 4, shown therein is one embodiment of a coil spring 110 for use in association with the first and second sets of pocketed coil springs 102, 104. In one embodiment of the invention, the coil spring 110 is formed from a metal spring wire including, for example, high carbon spring wire, Marshall Pack spring wire, or any other type of spring wire know to those of skill in the art. In a specific embodiment, the spring wire is automatic coiling and knotting high carbon spring wire. The diameter of the spring wire may vary depending on factors known to those of skill in the art including, for example, the amount of weight to be supported as well and the desired firmness of the coil spring 110. In a specific embodiment, the diameter of the wire used to form the coil spring 110 is 15 gauge. However, other diameters or gauges of spring wire are also contemplated as falling within the scope of the present invention.

In the illustrated embodiment, the coil spring 110 is wound in a helical or spiral pattern, including an upper coil $C_U$, a lower coil $C_L$, and a number of intermediate coils $C_I$. In one embodiment, the coil spring 110 is configured to define a barrel-shaped outer profile, with the upper coil $C_U$ and the lower coil $C_L$ having a lesser coil diameter than the intermediate coils $C_I$, and with the intermediate coils $C_I$ increasing in diameter toward the waist or mid-portion of the coil spring 110 to a maximum outer diameter D. In one embodiment, the outer coil diameter D of the coil spring 110 is about two and one-half (2.50) inches. However, it should be understood that the coil springs having other coil diameters are also contemplated as falling within the scope of the present invention.

As will be discussed in greater detail below, other configurations of coil springs are also contemplated for use in association with the present invention. For example, in one embodiment of the invention, some or possibly all of the coil springs 110 may be configured to define an hourglass-shaped outer profile, with the upper coil $C_U$ and the lower coil $C_L$ having a greater coil diameter than the intermediate coils $C_I$, and with the intermediate coils $C_I$ decreasing in diameter toward the waist or mid-portion of the coil spring 110. It should be appreciate that hourglass-shaped coil springs tend to provide a relatively greater degree of firmness (i.e., resistance to compression or loading) compared to barrel-shaped coil springs. In yet another embodiment of the invention, some or possibly all of the coil springs 110 may be configured to define a cylindrical-shaped outer profile, with the upper coil $C_U$, the lower coil $C_L$ and the intermediate coils $C_I$ all having a relatively uniform coil diameter. It should be understood that other shapes and configurations of coil springs in addition to those specifically described above are also contemplated as falling within the scope of the present invention.

In a preferred embodiment of the invention, subsequent to the fabrication of the coil springs 110, some or possibly all of the coil springs 110 are subjected to a heat tempering process. Heat tempering tends to build memory into the coil springs 110, to provide increased spring force/resistance, and/or to extend the longevity of the spring action/resiliency. In one embodiment of the invention, the heat tempering process includes the step of heating the coil springs 110 to a temperature range between about 500° F. (260° C.) and about 600° F. (316° C.). In a specific embodiment, the coil springs 110 are heated to the appropriate temperature by running 50 amperes of current across the length of the spring wire for approximately one (1) second. Further details regarding a heat tempering process suitable for use in association with the present invention are disclosed in U.S. Pat. No. 6,398,199 to Barber, the contents of which have been incorporated herein by reference. However, other methods for heat tempering or heat treating the coil springs 110 are also contemplated as falling with the scope of the present invention.

Figure 5A:
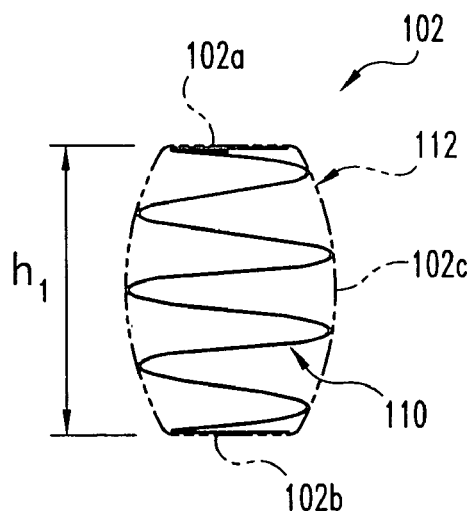
FIG. 5a is a side elevational view of the coil spring illustrated in FIG. 4, as shown in a pre-loaded compressed state and encased within a spring pocket to define a first pocketed coil spring height.
Figure 5B:
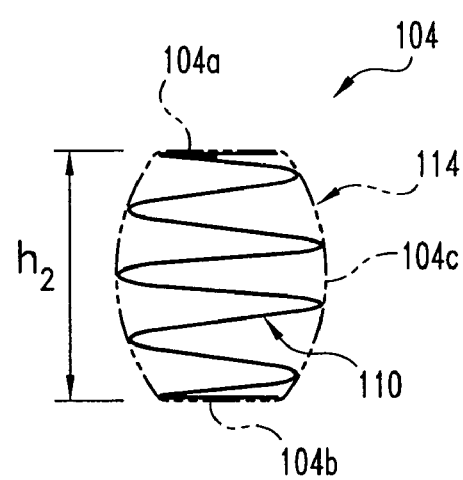
FIG. 5b is a side elevational view of the coil spring illustrated in FIG. 4, as shown in a pre-loaded compressed state and encased within a spring pocket to define a second pocketed coil spring height.

Referring to FIGS. 5a and 5b, shown therein are the coil springs 110 individually encased within outer spring pockets 112, 114 to form the pocketed coil springs 102, 104, respectively. As will be discussed below, one purpose of the spring pockets 112, 114 is to maintain the coil springs 110 in a pre-compressed or pre-loaded state. As should be apparent, the interior height of the spring pockets 112, 114 is approximately equal to the finished pocketed height $h_1$, $h_2$ of the pocketed coil springs 102, 104, respectively. Another purpose of the spring pockets 112, 114 is to provide a means for interconnecting adjacent coil springs to form rows or strips of coil springs $R_1$, $R_2$ and/or to interconnect adjacent rows or strips of coil springs to form dual strips $S_D$ or triple strips $S_T$ of coil springs which can in turn be interconnected to form the innerspring assembly 100. Yet another purpose of the spring pockets 112, 114 is to prevent adjacent coil springs from interfering with one another during compression and/or expansion.

The outer spring pockets 112, 114 are preferably formed from a fabric material. In one embodiment of the invention, the fabric is comprised of a material that allows the fabric to be joined or welded together by heat and/or pressure, such as, for example, in an ultrasonic welding procedure or another type of thermal welding procedure. In another embodiment of the invention, the fabric is comprised of a non-woven material. In a specific embodiment, the spring pockets 112, 114 are formed from a non-woven, thermoplastic fiber material, such as, for example, a non-woven polymer-based material, a non-woven polypropylene material, a non-woven polyester material, or any other non-woven fabric material that would occur to one of skill in the art. It should be understood, however, that the spring pockets 112, 114 may be formed from other materials, including woven materials and/or non polymer-based materials. For example, the spring pockets 112, 114 may be formed from a wide variety of textile fabrics or other types of sheet materials known to those of skill in the art. Textile fabric materials are particularly well suited for applications involving stitching, stapling, or other similar methods of interconnecting textile fabric material.

In one embodiment of the invention, the spring pockets 112, 114 are formed by providing a sheet of fabric material which is folded in half with the longitudinal or horizontal edges of the sheet being attached together by a longitudinal seam to form a sleeve pocket. The longitudinal seam may be formed, for example, by thermal/ultrasonic welding. A pre-compressed/pre-loaded coil spring 110 is then inserted into the sleeve in an upright or vertical orientation and the lateral or vertical edges of the sleeve on each side of the coil spring 110 are attached together by a cross seam to form the individually pocketed coil spring 102, 104. The cross seam may be formed, for example, by thermal/ultrasonic welding. In another embodiment of the invention, the sheet of fabric material may be wrapped or folded about the pre-compressed/pre-loaded coil spring 110 prior to seaming the longitudinal edges of the sheet. It should also be understood that other methods for forming the longitudinal seams and/or the cross seams are also contemplated, including, for example, stitching, stapling or any other method of seaming known to those of skill in the art.

As discussed above, in one embodiment of the invention, a series of pocketed coil springs 102, 104 are interconnected to form an integral/continuous string or strip S, with each strip S including a plurality of coil springs 110 arranged in an upright or vertical orientation. In this embodiment of the invention, a sheet of fabric material is provided having a length somewhat greater than the finished length of the strings S of pocketed coil springs 102, 104. As outlined above, the sheet material is folded in half with the longitudinal or horizontal edges of the sheet being attached together to form an elongate sleeve sized to receive a plurality of pre-compressed/pre-loaded coil springs 110 arranged along the length of the sleeve in an upright or vertical orientation. A vertical cross seam is then formed on each side of each coil spring 110 to form an integral/continuous string S of individually pocketed coil springs 102, 104. Various methods of forming rows or strips of pocketed coil springs are illustrated and described in U.S. Pat. No. 6,398,199 to Barber and co-pending U.S. Utility Application entitled "Encased Coil Innerspring Assembly" Ser. No. 10/722,850. It should be understood, however, that other methods of forming strips of pocketed coil springs are also contemplated as would occur to one of skill in the art.

As also discussed above, in one embodiment of the invention, adjacent rows or strips of the pocketed coil springs 102, 104 may be coupled together using any number of a variety of methods including, for example, thermal/ultrasonic welding to form a dual strip $S_D$ or a triple strip $S_T$ of pocketed coil springs. In one embodiment of the invention, adjacent rows or strips of the pocketed coil springs 102, 104 are coupled together via a vertical weld seam positioned on either side, or possibly one both sides, of one more of the above-discussed vertical cross seams that form the individual springs pockets 112, 114. As also discussed above, one or more of the dual strips $S_D$ and/or the triple strips $S_T$ of pocketed coil springs 102, 104 may subsequently be coupled together, such as, for example, by gluing, to form the complete coil innerspring assembly 100. One method of forming dual strips $S_D$ or triple strips $S_T$ of pocketed coil springs is disclosed in co-pending U.S. Utility Application entitled "Encased Coil Innerspring Assembly" Ser. No. 10/722,850. It should be understood, however, that other methods of forming dual strips $S_D$ or triple strips $S_T$ of pocketed coil springs are also contemplated as would occur to one of skill in the art.

In an alternative embodiment of the invention, the individually pocketed spring coils 102, 104 or the single strips S, dual strips $S_D$, and/or triple strips $S_T$ of the coil springs 102, 104 may be interconnected via a top securing sheet or scrim (not shown) and/or a bottom securing sheet or scrim (not shown) to form an integrated innerspring assembly 100. The top and bottom scrims may be formed of the same fabric material as the spring pockets 112, 114 or may be formed of a material that is softer and/or more stretchable than the spring pocket material, such as, for example, a polypropylene or polyester material. Alternatively, textile fabrics or other materials known to those of skill in the art may be used. The top and bottom scrims may be attached to the upper surfaces 102a, 104a and lower surfaces 102b, 104b, respectively, of the pocketed coil springs 102, 104. In one embodiment, the upper and lower scrims are connected to the pocketed coil springs 102, 104 by a hot melt adhesive. However, other methods of attachment are also contemplated as would occur to one of skill in the art. The inclusion of one or both of the top and bottom scrims may provide further securement and/or stabilization of the pocketed coil springs 102, 104 within the innerspring assembly 100. However, it should be understood that the top and bottom scrims are optional and are not necessarily required to form the innerspring assembly 100. Further details regarding the use of top and bottom scrims are illustrated and described in U.S. Pat. No. 6,398,199 to Barber.

As shown in FIG. 4, the coil spring 110 has an initial height $h_i$ when in an uncompressed/free-standing/relaxed state. As shown in FIG. 5a, a coil spring 110 is pre-loaded to a compressed state having a compressed height substantially equal to the pocketed height $h_1$ of the pocketed coil spring 102. The compressed coil spring 110 is encased within the spring pocket 112 to maintain the coil spring 110 in the compressed/pre-loaded state. Similarly, as shown in FIG. 5b, a coil spring 110 is pre-loaded to a compressed state having a compressed height substantially equal to the pocketed height $h_2$ of the pocketed coil spring 104. The compressed coil spring 110 is encased within the spring pocket 114 to maintain the coil spring 110 in the pre-loaded/compressed state.

It should be appreciated that the lesser amount of compression/pre-loading of the coil springs 102 (from initial height $h_i$ to compressed height $h_1$) compared to the compression/pre-loading of the coil springs 104 (from initial height $h_i$ to compressed height $h_2$) will correspondingly provide the coil springs 102 with a lesser degree of firmness or resistance to loading compared to that provided by the coil springs 104. The lesser degree of firmness provided by the coil springs 102 further enhances the initial "plush" feel provided by the coil springs 102 as the occupant lies down on the innerspring assembly 100, which in turn provides the occupant with an even greater degree of comfort. Additionally, the relatively greater degree of firmness provided by the coil springs 104 provides increased resistance to loading, which in turn provides a greater degree of support to the innerspring assembly 100.

As discussed above, in one embodiment of the invention, the pocketed height $h_1$ of the coil springs 102 is approximately seven (7) inches, whereas the pocketed height $h_2$ of the coil springs 104 is approximately six (6) inches. In a further embodiment of the invention, the coil springs 110 have an initial uncompressed/free-standing height $h_i$ of about eight (8) inches. It should therefore be apparent that in this particular embodiment, the coil springs 102 are compressed or preloaded approximately one (1) inch prior to being encased within the spring pocket 112, whereas the coil springs 104 are compressed or preloaded approximately two (2) inches prior to being encased within the spring pocket 114. Assuming all other spring characteristics remain constant (e.g., wire diameter, coil diameter, spring material, etc.), the increased compression or pre-loading of the coil springs 104 will provide the coil springs 104 with a greater degree of firmness relative to the coil springs 102.

Although the illustrated embodiment of the invention utilizes coil springs 110 having the same initial height $h_i$ when in an uncompressed/free-standing state to form the pocketed coil springs 102, 104, it should be understood that the coil springs 110 used to form the pocketed coil springs 102, 104 may have different initial heights $h_i$. For example, in order to further increase the relative firmness of the pocketed coil springs 104 compared to the pocketed coil springs 102, the initial height $h_i$ of the coil springs 110 used to form the pocketed coil springs 104 can be increased relative to the initial height $h_i$ of the coil springs 110 used to form the pocketed coil springs 102 (i.e., the amount of pre-loading associated with the pocketed coil springs 104 may be increased relative to that of the pocketed coil springs 102). Similarly, in order to decrease the relative firmness of the pocketed coil springs 104 compared to the pocketed coil springs 102, the initial height $h_i$ of the coil springs 110 used to form the pocketed coil springs 104 can be correspondingly reduced relative to the initial height $h_i$ of the coil springs 110 used to form the pocketed coil springs 102 (i.e., the amount of pre-loading associated with the pocketed coil springs 104 may be decreased relative to that of the pocketed coil springs 102). In other words, by increasing/decreasing the amount of pre-compression or pre-loading of the coil springs 110 between the initial height $h_i$ and the pocketed heights $h_1$, $h_2$, the firmness of the pocketed coil spring 102, 104 may be correspondingly increased/decreased.

Although the illustrated embodiment of the invention utilizes coil springs 110 having the same configuration and spring characteristics to form the pocketed coil springs 102, 104, it should be understood that the coil springs used to form the pocketed coil springs 102, 104 can have a different configurations and/or exhibit different spring characteristics. For example, as will be discussed in greater detail below, one of the pocketed coil springs 102, 104 can have a barrel-shaped configuration and the other an hourglass-shaped configuration, with the hourglass-shaped configuration generally providing a relatively greater degree of firmness. As will also be discussed in greater detail below, the pocketed coil springs 102, 104 can utilize coil springs having different coil diameters, with the smaller coil diameter springs generally providing a relatively greater degree of firmness. In another embodiment of the invention, the pocketed coil springs 102, 104 can utilize coil springs having different wire diameters, with the larger wire diameter springs generally providing a relatively greater degree of firmness. In still another embodiment of the invention, the pocketed coil springs 102, 104 can utilize coil springs having a different number of coils and/or a different spread between the coils, with the springs having the greater number of coils and/or the tighter coil spread generally providing a relatively greater degree of firmness.

Figure 6:
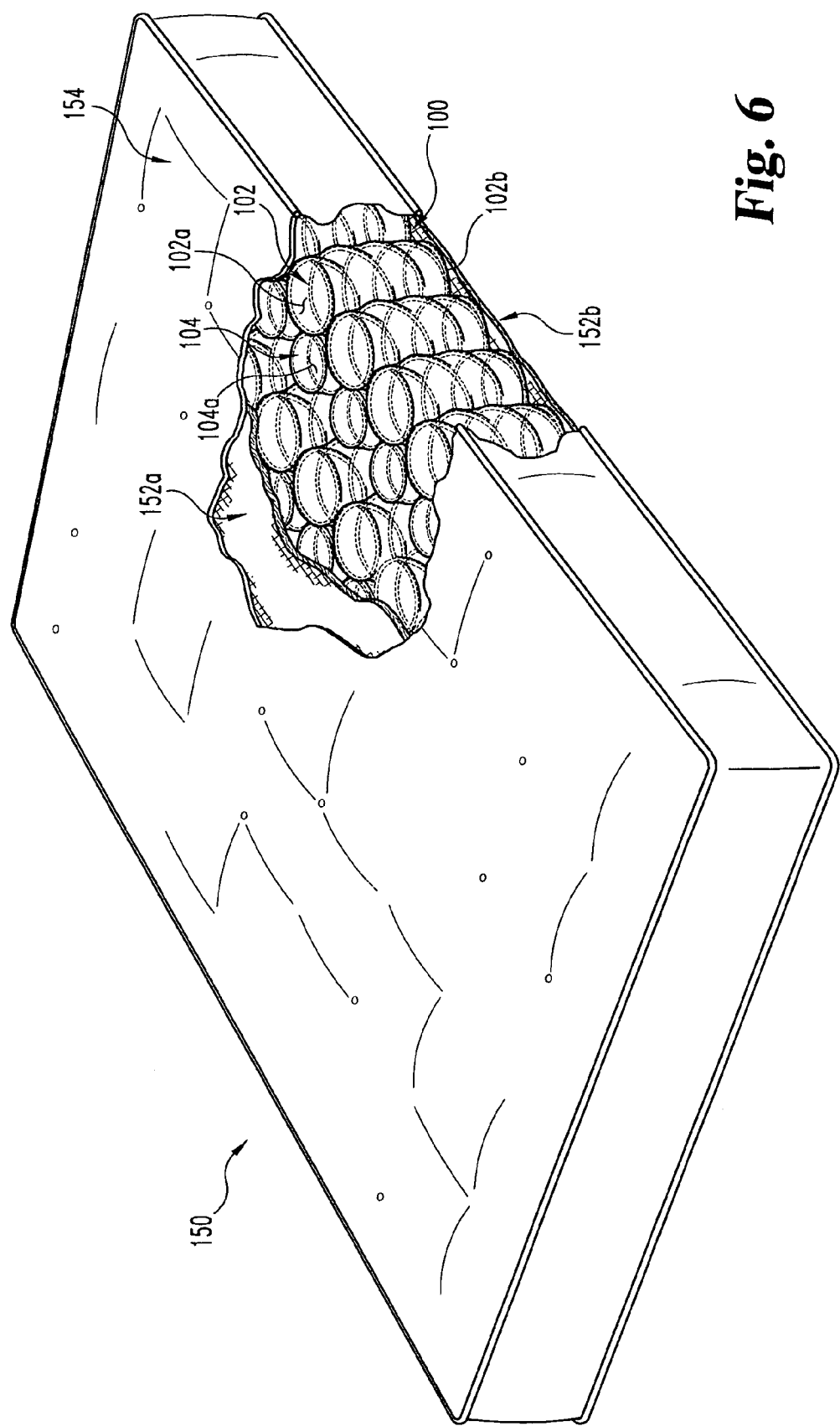
FIG. 6 is a side perspective view of the innerspring assembly illustrated in FIG. 1, as integrated into an innerspring mattress according to one embodiment of the present invention.

Referring now to FIG. 6, shown therein is an innerspring mattress assembly 150 according to one form of the present invention. In one embodiment, the innerspring mattress assembly 150 is comprised of the innerspring assembly 100, a sheet of padding material 152a extending along the top of the innerspring assembly 100, a sheet of padding material 152b extending along the bottom of the innerspring assembly 100, and an outer covering 154 extending about the entire innerspring assembly 100.

The sheets of padding material 152a, 152b may include, for example, sheets of foam, filling material, and/or any other type of mattress padding material that would occur to one of skill in the art. In one embodiment of the invention, the sheets of padding material 152a, 152b are attached directly to the upper and lower surfaces 102a, 102b, respectively, of the pocketed coil springs 102. If the innerspring assembly 100 includes top and/bottom scrims (not shown), the sheets of padding material 152a, 152b are attached to the outer surfaces of the top and bottom scrims, respectively. In one embodiment of the invention, the sheets of padding material 152a, 152b are attached to the pocketed coil springs 102 (or the top and bottom scrims) via an adhesive material, such as, for example, a hot melt adhesive. However, other methods of attachment are also contemplated as would occur to one of skill in the art. It should be appreciated that the sheets of padding material 152a, 152b may include more than one layer of material arranged in a stacked configuration to form multi-layered sheets of padding material 152a, 152b.

The outer covering 154 may include, for example, an upholstery covering or any other type of mattress upholstery material that would occur to one of skill in the art. In one embodiment of the invention, the outer covering 154 is attached to the sheets of padding material 152a, 152b via conventional upholstering techniques. However, other methods of attachment are also contemplated as would occur to one of skill in the art.

Figure 7:
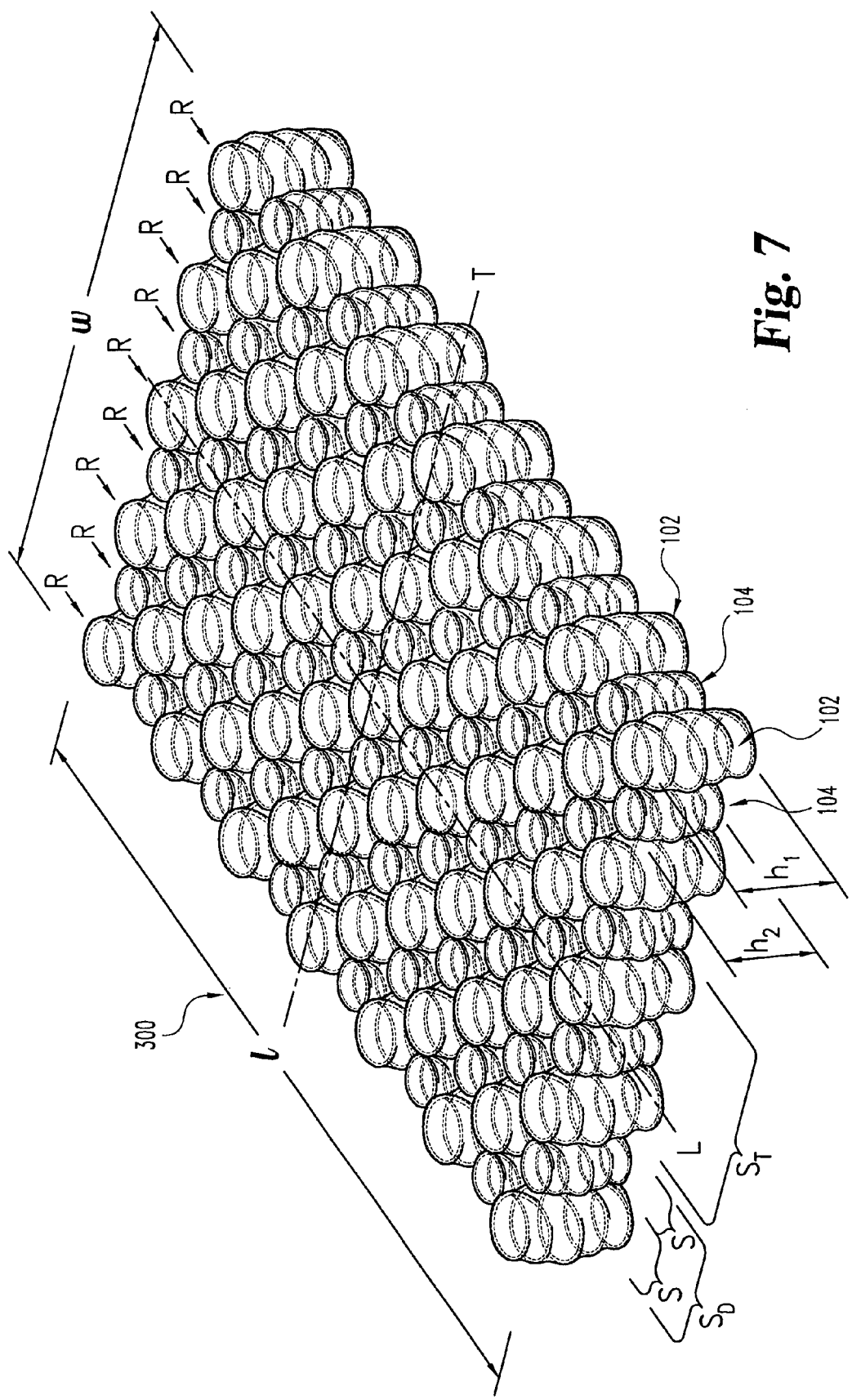
FIG. 7 is a side perspective view of an innerspring assembly according to another form of the present invention, including first and second sets of pocketed coil innersprings having different pocketed heights to provide the innerspring assembly with varying degrees of firmness.

Referring to FIG. 7, shown therein is a coil innerspring assembly 300 according to another form of the present invention. Similar to the innerspring assembly 100 illustrated in FIG. 1, the innerspring assembly 300 is generally comprised of a plurality of pocketed coil springs and has a length l extending generally along a longitudinal axis L and a width w extending generally along a transverse axis T. Furthermore, like the innerspring assembly 100, the innerspring assembly 300 includes at least two sets or groups of pocketed coil springs 102, 104 having different pocketed heights $h_1$, and $h_2$, respectively. However, it should be understood that in other embodiments of the invention, the innerspring assembly 300 may include three or more sets of pocketed coil springs, with each set of pocketed coil springs having a different pocketed height. Additionally, it should be understood that the pocketed coil springs 102, 104 that form the innerspring assembly 300 can take any of the alternative configurations and arrangements described above with regard to the innerspring assembly 100.

Similar to the innerspring assembly 100, the pocketed coil springs 102, 104 of the innerspring assembly 300 are arranged in axially extending rows R running along the length l (i.e., in a head-to-toe direction). However, unlike the innerspring assembly 100 in which each row $R_1$, $R_2$ is comprised entirely of the coil springs 102 or entirely of the coil springs 104, respectively, with each coil spring in each row having the same pocketed height $h_1$, $h_2$, the innerspring assembly 300 includes rows R that are comprised of a combination of coil springs 102, 104 having different pocketed heights $h_1$, $h_2$. In other words, each row R is comprised of a number of the pocketed coil springs 102 and a number of the pocketed coil springs 104.

In the illustrated embodiment of innersprings assembly 300, the pocketed coil springs 102, 104 arranged in an alternating manner along the length l of each row R. Additionally, adjacent rows R are arranged such that the pocketed coil springs 102 in one row are positioned laterally adjacent a pocketed coil spring 104 in the adjacent row. In this manner, the innerspring assembly 300 is configured such that the pocketed coil springs 102, 104 are arranged in an alternating manner along both the length l and width w of the innersprings assembly 300. In other words, a pocketed coil springs 102 is positioned axially adjacent and laterally adjacent each of the pocketed coil springs 104. As a result, the innerspring assembly 300 tends to have a greater degree of dispersion between the coil springs 102 defining the pocketed height $h_1$ and the coil springs 104 defining the pocketed height $h_2$. The increased dispersion between the pocketed coil springs 102, 104 tends to provide the innerspring assembly 300 with a more uniform feel across both the length l and the width w.

Similar to the innerspring assembly 100, the rows R of the pocketed coil springs 102, 104 which form the innerspring assembly 300 may be formed as integral/continuous strips or strings S. Likewise, adjacent strips S of the pocketed coil springs 102, 104 may be coupled together to form dual strips $S_D$ and/or triple strips $S_T$ of pocketed coil springs. Additionally, two or more of the dual strips $S_D$ and/or the triple strips $S_T$ of pocketed coil springs may subsequently be coupled together to form the innerspring assembly 300. The innerspring assembly 300 may then be integrated into an innerspring mattress, such as, for example, the innerspring mattress 150 illustrated in FIG. 6.

Figure 8:
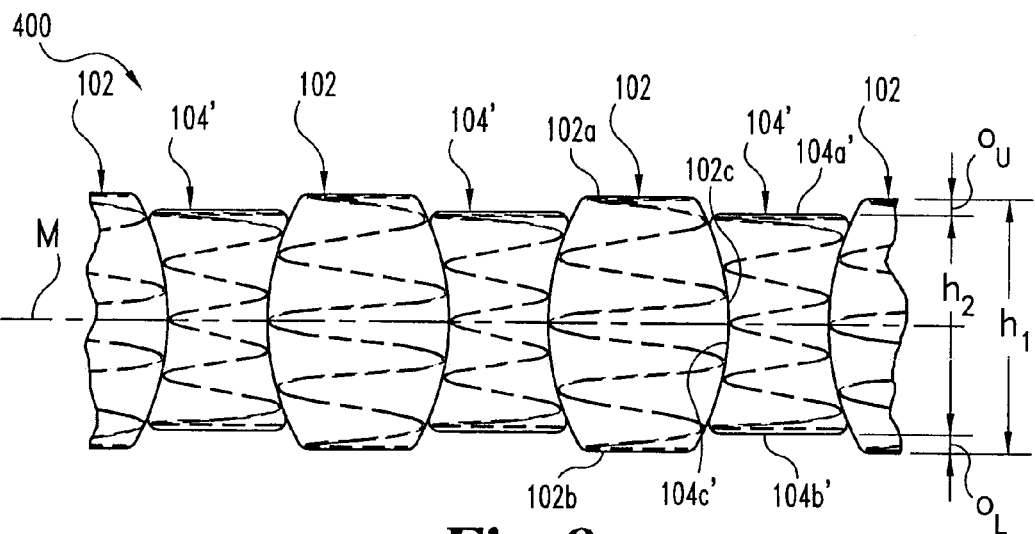
FIG. 8 is a partial end elevational view of an alternative embodiment of the innerspring assembly illustrated in FIG. 1, wherein a first set of the pocketed coil innersprings is barrel-shaped and a second set of the pocketed coil innersprings is hourglass-shaped.

Referring to FIG. 8, shown therein is an innerspring assembly 400 according to another embodiment of the present invention. Similar to the innerspring assembly 100, the innerspring assembly 400 is generally comprised of a plurality of pocketed coil springs 102, 104' arranged in rows $R_1$, $R_2$, respectively, and defining different pocketed heights $h_1$, $h_2$. Likewise, adjacent rows $R_1$, $R_2$ of the first and second sets of pocketed coil springs 102, 104' are arranged such that the mid-portions or waists of the pocketed coil springs 102, 104' extend generally along a central midline axis M, thereby defining an upper offset $o_U$ between the upper pocketed coil spring surfaces 102a, 104a' and a lower offset $o_L$ between the lower pocketed coil spring surfaces 102b, 104b'. However, unlike the innerspring assembly 100, wherein each of the pocketed coil springs 102, 104 is barrel-shaped, the innerspring assembly 400 includes a combination of barrel-shaped pocketed coil springs 102 and hourglass-shaped pocketed coil springs 104'. The barrel-shaped coil springs 102 have a convex side surface 102c while the hourglass-shaped coil springs 104' have a concave side surface 104c'. The adjacent rows $R_1$, $R_2$ of the pocketed coil springs 102, 104' are arranged such that the convex side surfaces 102c of the pocketed coil springs 102 are positioned proximately adjacent or nestled/nested within the concave side surfaces 104c' of the adjacent pocketed coil springs 104', with the side surfaces 102c, 104c' preferably being in direct contact with one another.

The innerspring assembly 400 functions in a manner similar to that of the innerspring assembly 100. Specifically, when an occupant lies down on the innerspring assembly 400, a grouping of the barrel-shaped coil springs 102 having the greater height $h_1$ will absorb the initial loading associated with the weight of the occupant. However, as the coil springs 102 are compressed and the upper surface 102*a* of the coil springs 102 are displaced to a position generally flush or even with the upper surface 104*a*' of the adjacent coil springs 104' (i.e., with the upper offset $o_U$ at or near zero), the coil springs 104' will also be compressed and will begin to absorb a portion of the loading associated with the weight of the occupant. As a result, the pocketed coil springs 102 provide the innerspring assembly 400 with a soft or "plush" feel to provide the occupant with an added degree of comfort, while the combined effects of the pocketed coil springs 102, 104' provide the innerspring assembly 400 with an added degree of support or firmness. As discussed above, since hourglass-shaped coil springs are generally firmer compared to barrel-shaped coil springs (i.e., exhibiting an increased resistance to compression or loading), inclusion of the hourglass-shaped coil springs 104' tends to provide the innerspring assembly 400 with an enhanced degree of support or firmness as compared to the innerspring assembly 100. Additionally, the nestling/nesting of the convex side surfaces 102*c* of the barrel-shaped coil springs 102 proximately adjacent the concave side surfaces 104*c*' of the adjacent hourglass-shaped coil springs 104' provides the innerspring assembly 400 with a relatively more compact or concentrated coil spring configuration along the width w of the innerspring assembly 400.

It should also be appreciated that the innerspring assembly 400 may be configured similar to the innerspring assembly 200 illustrated in FIG. 3. Specifically, the pocketed coil springs 102, 104' may be arranged in an alternating manner along both the length l and width w of the innersprings assembly 400. In this alternative arrangement, a barrel-shaped coil spring 102 would be positioned axially adjacent and laterally adjacent each of the hourglass-shaped coil springs 104'. This alternative arrangement would tend to provide a greater degree of dispersion between the barrel-shaped coil springs 102 and the hourglass-shaped coil springs 104', which in turn would provide a more uniform feel across the length l and width w of the innerspring assembly 400. Moreover, this alternative arrangement would also provide an even more compact or concentrated coil spring configuration along both the length l and width w of the innerspring assembly 400.

Figure 9:
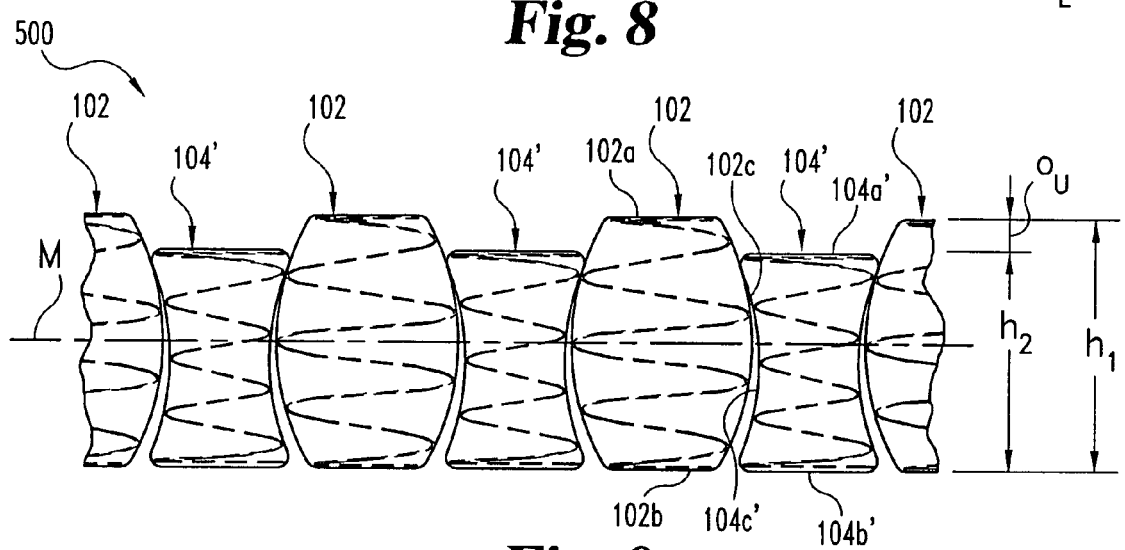
FIG. 9 is a partial end elevational view of an alternative embodiment of the innerspring assembly illustrated in FIG. 8, wherein the bottoms of each of the barrel-shaped and hourglass-shaped pocketed coil innersprings are arranged flush with one another.

Referring to FIG. 9, shown therein is an innerspring assembly 500 according to another embodiment of the present invention. Similar to the innerspring assembly 400, the innerspring assembly 500 is generally comprised of a plurality of barrel-shaped coil springs 102 and hourglass-shaped coil springs 104' arranged in rows $R_1$, $R_2$, respectively, and defining different pocketed height $h_1$, $h_2$, respectively. However, the adjacent rows $R_1$, $R_2$ of pocketed coil springs 102, 104' of the innerspring assembly 500 are arranged such that the bottom surfaces 102*b*, 104*b*' are substantially flush or even with one another so as to define an upper spring offset $o_U$ between the upper surfaces 102*a*, 104*a*', but with no lower spring offset. The innerspring assembly 500 is particularly useful when used in association with one-sided innerspring mattresses, commonly referred to as "no-flip" or "no-turn" mattresses, wherein the upper surfaces 102*a*, 104*a*' of the pocketed coil springs 102, 104' would preferably remain in an upwardly-facing direction.

Figure 10:
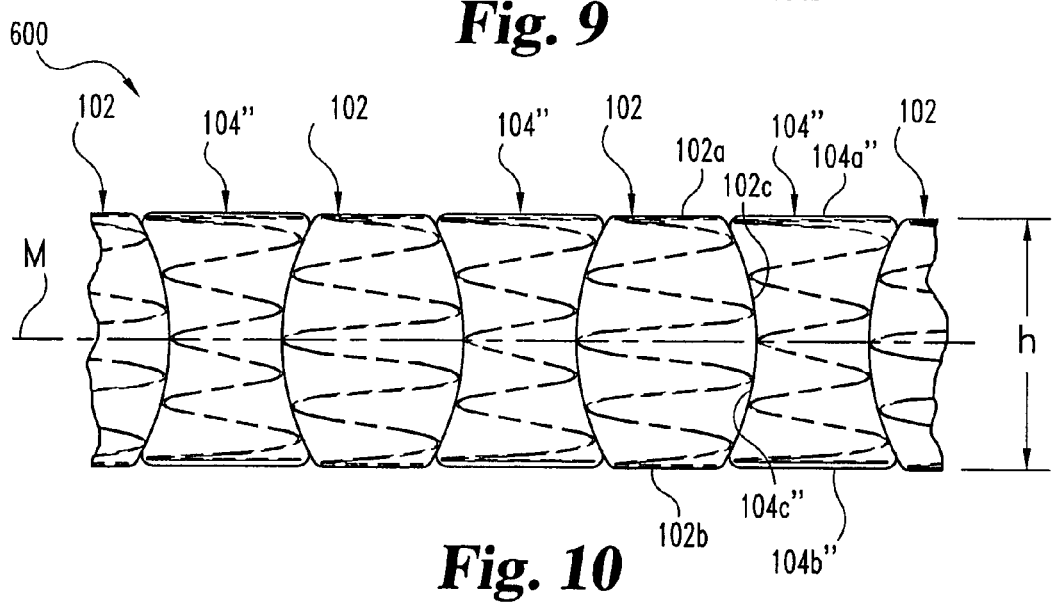
FIG. 10 is a partial end elevational view of an alternative embodiment of the innerspring assembly illustrated in FIG. 8, wherein each of the barrel-shaped and hourglass-shaped pocketed coil innersprings has a uniform height.

Referring to FIG. 10, shown therein is an innerspring assembly 600 according to another embodiment of the present invention. Similar to the innerspring assembly 400, the innerspring assembly 600 is generally comprised of a plurality of barrel-shaped coil springs 102 and hourglass-shaped coil springs 104'' arranged in rows $R_1$, $R_2$, respectively. Likewise, the adjacent rows $R_1$, $R_2$ of the pocketed coil springs 102, 104'' are arranged such that the convex side surfaces 102*c* of the barrel-shaped coil springs 102 are positioned proximately adjacent or nestled/nested within the concave side surfaces 104*c*'' of the adjacent hourglass-shaped coil springs 104'', with the side surfaces 102*c*, 104*c*'' preferably being in direct contact with one another. However, unlike the innerspring assembly 400, the barrel-shaped coil springs 102 and the hourglass-shaped coil springs 104'' of the innerspring assembly 600 define a uniform pocketed height h. In other word, the upper coil spring surfaces 102*a*, 104*a*'' and the lower coil spring surfaces 102*b*, 104*b*'' of the coil springs 102, 104'' are arranged substantially flush or even with one another.

Although the coil springs 102, 104'' of the innerspring assembly 600 have a substantially uniform height h, the hourglass-shaped coil springs 104'' will exhibit a somewhat greater degree of firmness compared to the barrel-shaped coil springs 102 (i.e., an increased resistance to compression or loading). Additionally, the nestling/nesting of the convex side surfaces 102*c* of the barrel-shaped coil springs 102 relative to the concave side surfaces 104*c*'' of the adjacent hourglass-shaped coil springs 104'' provides the innerspring assembly 600 with a compact or concentrated coil spring configuration along the width w and/or length l of the innerspring assembly 600.

Figure 11:
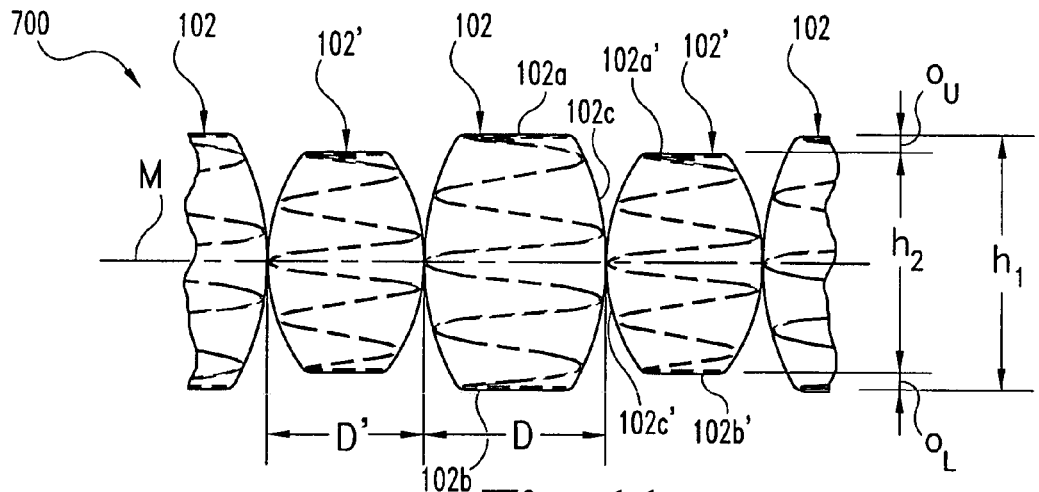
FIG. 11 is a partial end elevational view of an alternative embodiment of the innerspring assembly illustrated in FIG. 1, wherein the first and second sets of pocketed coil innersprings have different coil diameters.

Referring to FIG. 11, shown therein is an innerspring assembly 700 according to another embodiment of the present invention. Similar to the innerspring assembly 100, the innerspring assembly 700 is generally comprised of a plurality of pocketed coil springs 102, 102' arranged in rows $R_1$, $R_2$, respectively, and defining different pocketed height $h_1$, $h_2$, respectively. Likewise, adjacent rows $R_1$, $R_2$ of the first and second sets of pocketed coil springs 102, 102' are arranged such that the mid-portions or waists of the pocketed coil springs 102, 102' extend generally along a central midline axis M, thereby defining an upper offset $o_U$ between the upper pocketed coil spring surfaces 102*a*, 102*a*' and a lower offset $o_L$ between the lower pocketed coil spring surfaces 102*b*, 102*b*'. Additionally, the adjacent rows $R_1$, $R_2$ of the barrel-shaped coil springs 102, 102' are arranged such that the convex side surfaces 102*c*, 102*c*' are positioned proximately adjacent one another, and preferably in direct contact with one another. However, unlike the innerspring assembly 100, wherein each of the barrel-shaped coil springs 102, 104 has the same coil diameter D, the innerspring assembly 700 includes barrel-shaped coil springs 102' having a coil diameter D' that is somewhat less than the coil diameter D of the barrel-shaped coil springs 102.

The innerspring assembly 700 functions in a manner similar to that of the innerspring assembly 100. Specifically, when an occupant lies down on the innerspring assembly 700, the barrel-shaped coil springs 102 having the greater height $h_1$, and the large coil diameter D will absorb the initial loading associated with the weight of the occupant. However, as the coil springs 102 are compressed and the upper surface 102*a* of the coil springs 102 are displaced to a position generally flush or even with the upper surface 102*a*' of the coil springs 102' (i.e., with the upper offset $o_U$ at or near zero), the coil springs 102' will also be compressed and will begin to absorb a portion of the loading associated with the weight of the occupant. As a result, the pocketed coil springs 102 provide the innerspring assembly 700 with a soft or "plush" feel to provide the occupant with an added degree of comfort, while the combined effects of the pocketed coil springs 102, 102' provide the innerspring assembly 700 with an added degree of support or firmness. As discussed above, since coil springs having a smaller coil diameter are generally firmer than coil springs having a larger coil diameter (i.e., exhibiting an increased resistance to compression or loading), the inclusion of the smaller diameter coil springs 102' tends to provide the innerspring assembly 700 with an enhanced degree of support or firmness as compared to the innerspring assembly 100.

It should also be appreciated that the innerspring assembly 700 may be configured similar to the innerspring assembly 200 illustrated in FIG. 3, wherein the coil springs 102, 102' defining the differing coil diameters D, D', respectively, may be arranged in an alternating manner along both the length l and the width w of the innersprings assembly 700. In this alternative arrangement, a coil spring 102 having a larger diameter D would be positioned axially adjacent and laterally adjacent each of the coil springs 102' having the smaller coil diameter D'. This alternative arrangement would tend to provide a greater degree of dispersion between the coil springs 102, 102', which in turn would provide a more uniform feel across the length l and width w of the innerspring assembly 700.

Figure 12:
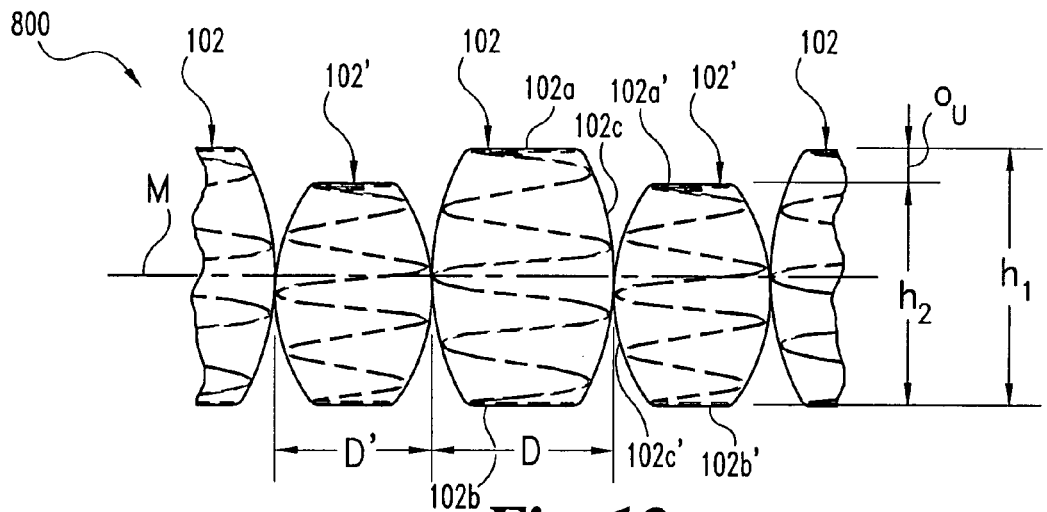
FIG. 12 is a partial end elevational view of an alternative embodiment of the innerspring assembly illustrated in FIG. 11, wherein the bottoms of each of the pocketed coil innersprings are arranged flush with one another.

Referring to FIG. 12, shown therein is an innerspring assembly 800 according to another embodiment of the present invention. Similar to the innerspring assembly 700, the innerspring assembly 800 is generally comprised of a plurality of barrel-shaped coil springs 102 having a larger coil diameter D and a plurality of barrel-shaped coil springs 102' having a smaller coil diameter D'. Likewise, the coil springs 102, 102' are arranged in rows $R_1$, $R_2$, respectively, and define different pocketed height $h_1$, $h_2$, respectively. However, the adjacent rows $R_1$, $R_2$ of pocketed coil springs 102, 102' of the innerspring assembly 800 are arranged such that the bottom surfaces 102b, 102b' are substantially flush or even with one another so as to define an upper spring offset $o_U$ between the upper surfaces 102a, 102a', but no lower spring offset. The innerspring assembly 800 is particularly useful when used in association with one-sided innerspring mattresses, commonly referred to as "no-flip" or "no-turn" mattresses, wherein the upper surfaces 102a, 102a' of the pocketed coil springs 102, 102' would preferably remain in an upwardly-facing direction.

Figure 13:
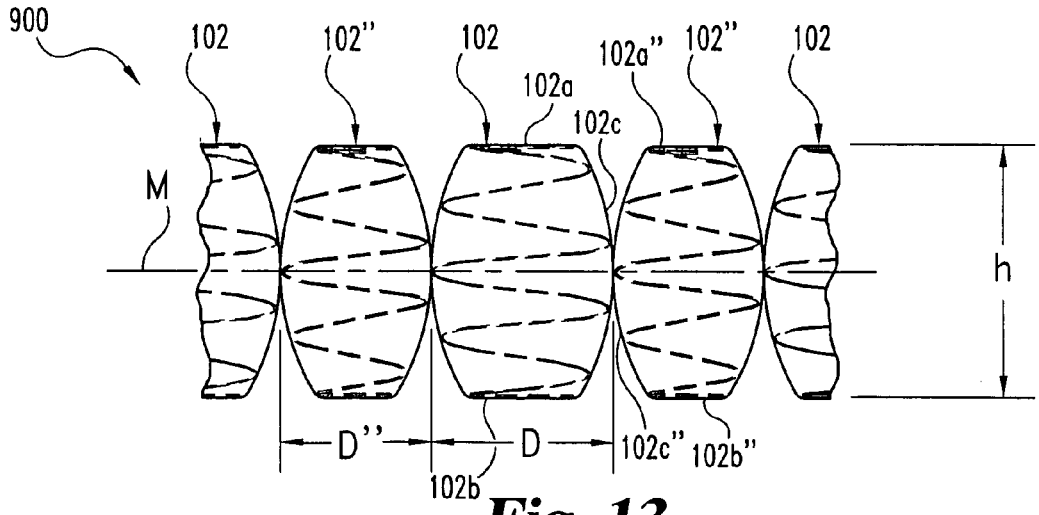
FIG. 13 is a partial end elevational view of an alternative embodiment of the innerspring assembly illustrated in FIG. 11, wherein each of the pocketed coil innersprings has a uniform height.

Referring to FIG. 13, shown therein is an innerspring assembly 900 according to another embodiment of the present invention. Similar to the innerspring assembly 700, the innerspring assembly 900 is generally comprised of a plurality of barrel-shaped coil springs 102 having a larger coil diameter D and a plurality of barrel-shaped coil springs 102" having a smaller coil diameter D". However, unlike the innerspring assembly 700, the barrel-shaped coil springs 102 and 102" of the innerspring assembly 900 define a uniform pocketed height h. In other word, the upper surfaces 102a, 102a" and the bottom surfaces 102b, 102b" of the coil springs 102, 102" are arranged substantially flush or even with one another. Although the coil springs 102, 102" of the innerspring assembly 900 have a substantially uniform height h, the coil springs 102" having the smaller coil diameter D" will exhibit a somewhat greater degree of firmness compared to the coil springs 102 having the larger coil diameter D (i.e., an increased resistance to compression or loading).

Referring to FIG. 14, shown therein is an innerspring assembly 1000 according to another embodiment of the present invention. Similar to the innerspring assembly 100, the innerspring assembly 1000 is generally comprised of a plurality of pocketed coil springs 102 arranged in rows $R_1$, $R_2$. However, unlike the innerspring assembly 100, each of the pocketed coil springs 102 has substantially the same pocketed spring height h. Nevertheless, since the rows $R_1$ of pocketed coil springs 102 are arranged at a different elevation compared to the rows $R_2$ of pocketed coil springs 102, an upper coil spring offset $o_U$ is formed between the upper surfaces 102a of the first row $R_1$ of pocketed coil springs 102 and the upper surfaces 102a of the second row $R_2$ of pocketed coil springs 102. Similarly, a lower coil spring offset $o_L$ is formed between the lower surfaces 102b of the first row $R_1$ of pocketed coil springs 102 and the lower surfaces 102b of the second row $R_2$ of pocketed coil springs 102.

The innerspring assembly 1000 functions in a manner similar to that of the innerspring assembly 100. Specifically, when an occupant lies down on the innerspring assembly 1000, the pocketed coil springs 102 in the rows $R_1$ (i.e., the pocketed coil springs 102 having the elevated upper surfaces 102a) will absorb the initial loading associated with the weight of the occupant. However, as a certain grouping of the pocketed coil springs 102 in the rows $R_1$ are compressed and the upper surface 102a are displaced to a position generally flush or even with the upper surface 102a of the pocketed coil springs 102 in the adjacent rows $R_2$ (i.e., with the upper spring offset $o_U$ at or near zero), the pocketed coil springs 102 in the adjacent rows $R_2$ will also be compressed and will begin to absorb a portion of the loading associated with the weight of the occupant. As a result, the pocketed coil springs 102 in the rows $R_1$ provide the innerspring assembly 1000 with an initial soft or "plush" feel to provide the occupant with an added degree of comfort, while the combined effects of the pocketed coil springs 102 in the adjacent rows $R_1$, $R_2$ provide the innerspring assembly 1000 with an added degree of support or firmness.

It should also be appreciated that the innerspring assembly 1000 may be configured similar to the innerspring assembly 300 illustrated in FIG. 7, wherein the coil springs 102 that are positioned at different elevations may be arranged in an alternating manner along both the length l and the width w of the innerspring assembly 1000. In this alternative arrangement, the pocketed coil springs 102 at the higher elevation would be positioned axially adjacent and laterally adjacent each of the pocketed coil springs 102 positioned at the lower elevation. This alternative arrangement would tend to provide a greater degree of dispersion between the coil springs 102 positioned at the higher/lower elevations, which in turn would provide a more uniform feel across the length l and width w of the innerspring assembly 1000.

As discussed above, coil springs that are pre-loaded/pre-compressed by a greater amount will tend to exhibit a greater degree of firmness (i.e., an increased resistance to compression or loading). It should be appreciated that this concept may be incorporated into the design of the innerspring assembly 1000. For example, referring to FIG. 15a, shown therein is coil spring 110 having an initial height $h_i$ when in an uncompressed/free-standing/relaxed state. Referring to FIG. 15b, shown therein is coil spring 110' having an initial height $h_i'$ when in an uncompressed/free-standing/relaxed state that is somewhat greater than the initial height $h_i$ of the coil spring 110. As shown in FIG. 16a, the coil spring 110 is pre-loaded to a compressed state and encased within a spring pocket 112 to define a pocketed coil spring 102 having a pocketed height h. Similarly, as shown in FIG. 16b, the coil spring 110' is also pre-loaded to a compressed state and encased within a spring pocket 112 so as to define a pocketed coil spring 102' having a pocketed height h that is substantially equal to the pocketed height h of the pocketed coil springs 102.

Notably, even though the pocketed coil springs 102, 102' each have a substantially uniform pocketed height h and each utilizes similarly configured coil springs 110, 110' (e.g., the same wire diameter, coil diameter, spring material, etc,), since the initial uncompressed/freestanding height $h_i$ of the coil spring 110 is somewhat less than the initial uncompressed/freestanding height $h_i'$ of the coil spring 110', the pocketed coil springs 102, 102' will exhibit different degrees of firmness. More particularly, since the coil spring 110 is subject to a reduced amount of pre-compression/pre-loading compared to the pre-compression/pre-loading of the coil spring 110', the pocketed coil spring 102 will exhibit a lesser degree of firmness compared to the pocketed coil spring 102'. The lesser degree of firmness provided by the pocketed coil springs 102 relative to the pocketed coil spring 102' may be used to further enhances the initial "plush" feel provided by the coil springs 102 as the occupant lies down on the innerspring assembly 1000, which in turn would provide the occupant with an enhanced degree of comfort. Additionally, the relatively greater degree of firmness provided by the pocketed coil spring 102' would provide increased resistance to loading, which in turn would provide a greater degree of support to the innerspring assembly 1000.

While the invention has been illustrated and described in detail in the drawings and foregoing description, the same is to be considered as illustrative and not restrictive in character, it being understood that only the preferred embodiments have been shown and described, and that all changes and modifications that come within the spirit of the invention are desired to be protected.

For example, it should be understood that one or more of the elements, features and/or characteristics of the embodiments of the invention illustrated and described above may be combined to form further embodiments of the present invention. It should also be understood that the elements, features and/or characteristics of the embodiments of the invention illustrated and described above may be combined with the elements, features and/or characteristics disclosed in U.S. Pat. No. 6,398,199 to Barber and the co-pending U.S. Utility Application entitled "Encased Coil Innerspring Assembly" Ser. No. 10/722,850 may be combined to form additional embodiments of the present invention.

What is claimed is:

1. An innerspring assembly including at least two sets of coil springs, comprising:
   a first set of coil springs having upper surfaces at a first elevation;
   a second set of coil springs having upper surfaces at a second elevation that is offset from said first elevation; and
   wherein said first set of coil springs has a first height, said second set of coil springs having a second height that is substantially equal to said first height; and
   wherein one of said first and second sets of coil springs is compressed upon initial loading of the innerspring assembly, each of said first and second sets of coil springs being compressed upon continued loading of the innerspring assembly.

2. An innerspring assembly including at least two sets of coil springs, comprising:
   a first set of coil springs having upper surfaces at a first elevation;
   a second set of coil springs having upper surfaces at a second elevation that is offset from said first elevation; and
   wherein each of said coil springs are individually encased in a pocket; and
   wherein one of said first and second sets of coil springs is compressed upon initial loading of the innerspring assembly, each of said first and second sets of coil springs being compressed upon continued loading of the innerspring assembly.

3. An innerspring assembly including at least two sets of coil springs, comprising:
   a first set of coil springs having upper surfaces at a first elevation;
   a second set of coil springs having upper surfaces at a second elevation that is offset from said first elevation; and
   wherein each of said coil springs are individually encased in a pocket; and
   wherein one of said first and second sets of coil springs is compressed upon initial loading of the innerspring assembly, each of said first and second sets of coil springs being compressed upon continued loading of the innerspring assembly; and
   wherein said first set of coil springs has a barrel-shaped outer profile defining a convex side surface, said second set of coil springs having an hourglass-shaped outer profile defining a concave side surface, and wherein said convex side surface of one of said barrel-shaped coil springs is positioned proximate said concave side surface of one of said hourglass-shaped coil springs.

4. The innerspring assembly of claim 7, wherein said first set of coil springs has a barrel-shaped outer profile defining a first outer coil diameter, said second set of coil springs having a barrel-shaped outer profile defining a second outer coil diameter that is different from said first outer coil diameter.

5. An innerspring assembly including at least two sets of coil springs, comprising:
   a first set of coil springs having upper surfaces at a first elevation;
   a second set of coil springs having upper surfaces at a second elevation that is offset from said first elevation; and
   wherein at least one of said first and second sets of coil springs is pre-loaded to a compressed state; and
   wherein one of said first and second sets of coil springs is compressed upon initial loading of the innerspring assembly, each of said first and second sets of coil springs being compressed upon continued loading of the innerspring assembly.

6. The innerspring assembly of claim 5, wherein said first set of coil springs is pre-loaded to a first compressed state, said second set of coil springs being pre-loaded to a second compressed state, and wherein said first and second compressed states exhibit different degrees of firmness.

7. The innerspring assembly of claim 6, wherein said first set of coil springs has a first uncompressed height when in a relaxed state, said second set of coil springs having a second uncompressed height when in a relaxed state that is substantially equal to said first uncompressed height.

8. The innerspring assembly of claim 7, wherein said first set of coil springs has a first compressed height when in said first compressed state, said second set of coil springs having a second compressed height when in said second compressed state that is different than said first compressed height.

9. The innerspring assembly of claim 6, wherein said first set of coil springs has a first uncompressed height when in a relaxed state, said second set of coil springs having a second uncompressed height when in a relaxed state that is different than said first uncompressed height.

10. The innerspring assembly of claim 9, wherein said first set of coil springs has a first compressed height when in said first compressed state, said second set of coil springs having a second compressed height when in said second compressed state that is substantially equal to said first compressed height.

11. The innerspring assembly of claim 6, wherein each of said coil springs are individually encased in a pocket to maintain each of said coil springs in said compressed state.

12. The innerspring assembly of claim 11, wherein said first and second sets of coil springs have a substantially uniform pocketed height.

13. The innerspring assembly of claim 11, wherein said first set of coil springs has a first pocketed height, said second set of coil springs having a second pocketed height that is different than said first pocketed height.

14. The innerspring assembly of claim 5, wherein said at least one of said first and second sets of coil springs is heat-tempered prior to being pre-loaded to said compressed state.

15. An innerspring assembly including at least two sets of coil springs, comprising:
a first set of coil springs having upper surfaces at a first elevation;
a second set of coil springs having upper surfaces at a second elevation that is offset from said first elevation; and
at least one additional set of coils springs having upper surfaces at a third elevation offset from said first and second elevations; and
wherein one of said first and second sets of coil springs is compressed upon initial loading of the innerspring assembly, each of said first and second sets of coil springs being compressed upon continued loading of the innerspring assembly.

16. An innerspring assembly including at least two sets of coil springs, comprising:
a first set of coil springs having a first height;
a second set of coil springs having a second height that is different from said first height; and
at least one additional set of coils springs having another height that is different from said first and second heights; and
wherein one of said first and second sets of coil springs is compressed upon initial loading of the innerspring assembly, each of said first and second sets of coil springs being compressed upon continued loading of the innerspring assembly.

17. An innerspring assembly including at least two sets of coil springs, comprising:
a first set of coil springs having a first height;
a second set of coil springs having a second height that is different from said first height; and
wherein said first set of coil springs is pre-loaded to a first compressed state, said second set of coil springs being pre-loaded to a second compressed state, and wherein said first and second compressed states exhibit different degrees of firmness; and wherein one of said first and second sets of coil springs is compressed upon initial loading of the innerspring assembly, each of said first and second sets of coil springs being compressed upon continued loading of the innerspring assembly.

18. The innerspring assembly of claim 17, wherein said first set of coil springs has a first uncompressed height when in a relaxed state, said second set of coil springs having a second uncompressed height when in a relaxed state that is substantially equal to said first uncompressed height.

19. The innerspring assembly of claim 17, wherein said first set of coil springs has a first uncompressed height when in a relaxed state, said second set of coil springs having a second uncompressed height when in a relaxed state that is different than said first uncompressed height.

20. An innerspring assembly including at least two sets of coil springs, comprising:
a first set of coil springs pre-loaded to a first compressed state;
a second set of coil springs pre-loaded to a second compressed state, and
wherein said first set of coil springs has a first uncompressed height when in a relaxed state, said second set of coil springs having a second uncompressed height when in a relaxed state that is substantially equal to said first uncompressed height; and
wherein said first and second compressed states exhibit different degrees of firmness.

21. The innerspring assembly of claim 20, wherein at least one of said first and second sets of coil springs is heat-tempered prior to being pre-loaded to said compressed state.

22. An innerspring assembly including at least two sets of coil springs, comprising:
a first set of coil springs pre-loaded to a first compressed state;
a second set of coil springs pre-loaded to a second compressed state, and
wherein each of said coil springs are individually encased in a pocket to maintain each of said coil springs in said compressed state; and
wherein said first set of coil springs has a first pocketed height, said second set of coil springs having a second pocketed height that is different than said first pocketed height; and
wherein said first and second compressed states exhibit different degrees of firmness.

23. The innerspring assembly of claim 22, wherein said first set of coil springs has a first compressed height when in said first compressed state, said second set of coil springs having a second compressed height when in said second compressed state that is different than said first compressed height.

24. The innerspring assembly of claim 22, wherein said first set of coil springs has a first uncompressed height when in a relaxed state, said second set of coil springs having a second uncompressed height when in a relaxed state that is different than said first uncompressed height.

25. The innerspring assembly of claim 24, wherein said first set of coil springs has a first compressed height when in said first compressed state, said second set of coil springs having a second compressed height when in said second compressed state that is substantially equal to said first compressed height.

26. An innerspring assembly including at least two sets of coil springs, comprising:
a first set of coil springs pre-loaded to a first compressed state;

a second set of coil springs pre-loaded to a second compressed state, and wherein said first set of coil springs has a first height, said second set of coil springs having a second height that is different from said first height, and wherein one of said first and second sets of coil springs is compressed upon initial loading of the innerspring assembly, each of said first and second sets of coil springs being compressed upon continued loading of the innerspring assembly; and wherein said first and second compressed states exhibit different degrees of firmness.

27. An innerspring assembly including at least two sets of coil springs, comprising:

a first set of coil springs pre-loaded to a first compressed state;

a second set of coil springs pre-loaded to a second compressed state, and wherein said first set of coil springs has an upper surface arranged at a first elevation, said second set of coil springs having an upper surface arranged at a second elevation that is offset from said first elevation, and wherein one of said first and second sets of coil springs is compressed upon initial loading of the innerspring assembly, each of said first and second sets of coil springs being compressed upon continued loading of the innerspring assembly; and wherein said first and second compressed states exhibit different degrees of firmness.

28. The innerspring assembly of claim 27, wherein each of said coil springs are individually encased in a pocket to maintain each of said coil springs in said compressed state.

29. The innerspring assembly of claim 28, wherein said first and second sets of coil springs have a substantially uniform pocketed height.

30. An innerspring assembly including at least two sets of coil springs, comprising:

a first set of coil springs having a barrel-shaped outer profile defining a convex side surface;

a second set of coil springs having an hourglass-shaped outer profile defining a concave side surface; and wherein said convex side surface of one of said barrel-shaped coil springs is positioned proximate said concave side surface of one of said hourglass-shaped coil springs.

31. The innerspring assembly of claim 30, wherein said convex side surface of said one of said barrel-shaped coil springs is positioned proximate said concave surface of at least two hourglass-shaped coil springs.

32. The innerspring assembly of claim 30, wherein said convex side surface of said one of said barrel-shaped coil springs is positioned proximate said concave surface of four of said hourglass-shaped coil springs.

33. The innerspring assembly of claim 30, wherein said first set of coil springs has a first height, said second set of coil springs having a second height that is different from said first height, and wherein one of said first and second sets of coil springs is compressed upon initial loading of the innerspring assembly, each of said first and second sets of coil springs being compressed upon continued loading of the innerspring assembly.

34. The innerspring assembly of claim 30, wherein said first set of coil springs has an upper surface arranged at a first elevation, said second set of coil springs having an upper surface arranged at a second elevation that is offset from said first elevation, and wherein one of said first and second sets of coil springs is compressed upon initial loading of the innerspring assembly, each of said first and second sets of coil springs being compressed upon continued loading of the innerspring assembly.

35. An innerspring assembly including at least two sets of coil springs, comprising:

a first set of coil springs defining a first outer coil diameter;

a second set of coil springs defining a second outer coil diameter; and wherein said first outer coil diameter of said first set of coil springs is different from said second outer coil diameter of said second set of coil springs; and wherein said first set of coil springs has a first height, said second set of coil springs having a second height that is different from said first height, and wherein one of said first and second sets of coil springs is compressed upon initial loading of the innerspring assembly, each of said first and second sets of coil springs being compressed upon continued loading of the innerspring assembly.

36. The innerspring assembly of claim 35, wherein at least one of said first and second sets of coil springs has a barrel-shaped outer profile.

37. The innerspring assembly of claim 36, wherein each of said first and second sets of coil springs has a barrel-shaped outer profile.

38. An innerspring assembly including at least two sets of coil springs, comprising:

a first set of coil springs defining a first outer coil diameter;

a second set of coil springs defining a second outer coil diameter; and wherein said first outer coil diameter of said first set of coil springs is different from said second outer coil diameter of said second set of coil springs; and wherein said first set of coil springs has an upper surface arranged at a first elevation, said second set of coil springs having an upper surface arranged at a second elevation that is offset from said first elevation, and wherein one of said first and second sets of coil springs is compressed upon initial loading of the innerspring assembly, each of said first and second sets of coil springs being compressed upon continued loading of the innerspring assembly.

39. The innerspring assembly of claim 38, wherein at least one of said first and second sets of coil springs has a barrel-shaped outer profile.

40. The innerspring assembly of claim 39, wherein each of said first and second sets of coil springs has a barrel-shaped outer profile.

41. An innerspring assembly including at least two sets of coil springs, comprising:

a first set of coil springs having a first height;

a second set of coil springs having a second height that is different from said first height; and wherein at least one of said first and second sets of coil springs is pre-loaded to a first compressed state; and wherein one of said first and second sets of coil springs is compressed upon initial loading of the innerspring assembly, each of said first and second sets of coil springs being compressed upon continued loading of the innerspring assembly.

* * * * *